(12) United States Patent
Genda et al.

(10) Patent No.: US 8,254,710 B2
(45) Date of Patent: Aug. 28, 2012

(54) COMPRESSION METHOD, EXTENSION METHOD AND IMAGE PROCESSING APPARATUS

(75) Inventors: Daisuke Genda, Saitama (JP); Hideki Morita, Hino (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 972 days.

(21) Appl. No.: 12/241,167

(22) Filed: Sep. 30, 2008

(65) Prior Publication Data
US 2009/0092331 A1 Apr. 9, 2009

(30) Foreign Application Priority Data

Oct. 4, 2007 (JP) ................................ 2007-260877

(51) Int. Cl.
G06K 9/36 (2006.01)
G06K 9/38 (2006.01)
G06K 9/46 (2006.01)
G06K 9/34 (2006.01)
(52) U.S. Cl. ........................................ 382/251; 382/173
(58) Field of Classification Search .................. None
See application file for complete search history.

(56) References Cited

U.S. PATENT DOCUMENTS

| 5,414,527 | A | * | 5/1995 | Koshi et al. | 382/239 |
|---|---|---|---|---|---|
| 5,838,455 | A | * | 11/1998 | Imaizumi et al. | 358/3.1 |
| 5,987,176 | A | * | 11/1999 | Imaizumi et al. | 382/232 |
| 6,404,919 | B1 | * | 6/2002 | Nishigaki et al. | 382/176 |
| 6,538,771 | B1 | * | 3/2003 | Sakatani et al. | 358/2.1 |
| 6,792,157 | B1 | * | 9/2004 | Koshi et al. | 382/251 |
| 6,950,557 | B2 | * | 9/2005 | Kimura | 382/239 |
| 2001/0007595 | A1 | * | 7/2001 | Mishima | 382/232 |
| 2005/0244062 | A1 | * | 11/2005 | Shaked et al. | 382/232 |
| 2006/0028686 | A1 | * | 2/2006 | Bergman et al. | 358/2.1 |
| 2007/0097450 | A1 | * | 5/2007 | Yamamoto | 358/426.01 |

FOREIGN PATENT DOCUMENTS

JP 11-164150 A 6/1999
JP 2002190956 A 7/2002

OTHER PUBLICATIONS

Japanese Office Action dated Aug. 25, 2009, with English-language translation.

* cited by examiner

Primary Examiner — Li Liu
(74) Attorney, Agent, or Firm — Buchanan Ingersoll & Rooney PC

(57) ABSTRACT

In a compression method of quantizing and compressing image data of an image, the method comprises the steps of: determining a method of quantization for each pixel; quantizing the image data in pixel unit according to the determined quantization method; storing the quantized image data in a same region of a memory in spite of the quantization method; and storing discrimination data for discriminating the quantization method used for quantizing the image data by corresponding to the quantized image data in the memory.

13 Claims, 25 Drawing Sheets

FIG.4

| a00 | a01 | a02 | a03 | a04 | a05 | a06 | a07 |
|---|---|---|---|---|---|---|---|
| a10 | a11 | a12 | a13 | a14 | a15 | a16 | a17 |
| a20 | a21 | a22 | a23 | a24 | a25 | a26 | a27 |
| a30 | a31 | a32 | a33 | a34 | a35 | a36 | a37 |
| a40 | a41 | a42 | a43 | a44 | a45 | a46 | a47 |
| a50 | a51 | a52 | a53 | a54 | a55 | a56 | a57 |
| a60 | a61 | a62 | a63 | a64 | a65 | a66 | a67 |
| a70 | a71 | a72 | a73 | a74 | a75 | a76 | a77 |

ORIGINAL IMAGE (1200dpi, 8bit)

→

| b00 | b01 | b02 | b03 |
|---|---|---|---|
| b10 | b11 | b12 | b13 |
| b20 | b21 | b22 | b23 |
| b30 | b31 | b32 | b33 |

PROCESSED IMAGE (600dpi, 4bit)

FIG.5

DIFFERENCE PLANE

| min(7) | min(6) | Max(7) | Max(6) |
|---|---|---|---|
| min(5) | min(4) | Max(5) | Max(4) |
| min(3) | min(2) | Max(3) | Max(2) |
| min(1) | min(0) | Max(1) | Max(0) |

| 3bit |
|---|
| 2bit |
| 1bit |
| 0bit |

DISCERIMINATION PLANE

| flag(b00) | flag(b01) | flag(b02) | flag(b03) |
|---|---|---|---|
| flag(b10) | flag(b11) | flag(b12) | flag(b13) |
| flag(b20) | flag(b21) | flag(b22) | flag(b23) |
| flag(b30) | flag(b31) | flag(b32) | flag(b33) |

BTC PLANE(2bit)

| BTC(b00) | BTC(b01) | BTC(b02) | BTC(b03) |
|---|---|---|---|
| BTC(b10) | BTC(b11) | BTC(b12) | BTC(b13) |
| BTC(b20) | BTC(b21) | BTC(b22) | BTC(b23) |
| BTC(b30) | BTC(b31) | BTC(b32) | BTC(b33) |

FIG.9

■ DENSITY PATTERN H0
PIXEL NOT LESS THAN THa3 IS ONE

| a00 | a01 |
|---|---|
| a10 | a11 |

→

| 1 | 0 |
|---|---|
| 0 | 0 | or

| 0 | 1 |
|---|---|
| 0 | 0 | or

| 0 | 0 |
|---|---|
| 1 | 0 | or

| 0 | 0 |
|---|---|
| 0 | 1 |

→ BTC(b00)=00

■ DENSITY PATTERN H1
PIXELS NOT LESS THAN THa3 ARE TWO, AND FOLLOWING PATTERN

| a00 | a01 |
|---|---|
| a10 | a11 |

→

| 1 | 1 |
|---|---|
| 0 | 0 | or

| 1 | 0 |
|---|---|
| 1 | 0 | or

| 0 | 1 |
|---|---|
| 0 | 1 | or

| 0 | 0 |
|---|---|
| 1 | 1 |

→ BTC(b00)=01

■ DENSITY PATTERN H2
PIXELS NOT LESS THAN THa3 ARE TWO, AND FOLLOWING PATTERN

| a00 | a01 |
|---|---|
| a10 | a11 |

→

| 0 | 1 |
|---|---|
| 1 | 0 | or

| 0 | 0 |
|---|---|
| 1 | 1 | or

| 1 | 0 |
|---|---|
| 0 | 1 |

→ BTC(b00)=10

■ DENSITY PATTERN H3
PIXEL NOT LESS THAN THa3 ARE THREE

| a00 | a01 |
|---|---|
| a10 | a11 |

→

| 0 | 1 |
|---|---|
| 1 | 1 | or

| 1 | 0 |
|---|---|
| 1 | 1 | or

| 1 | 1 |
|---|---|
| 0 | 1 | or

| 1 | 1 |
|---|---|
| 1 | 0 |

→ BTC(b00)=11

PROCESSED IMAGE (600dpi, 4bit)

RESTORED IMAGE (1200dpi, 8bit)

FIG.16

■ BTC(b00)=01 → DENSITY PATTERN H1 bij → | 1 | 0 |
      | 0 | 0 |
or
| 0 | 1 |
| 0 | 0 |
or
| 0 | 0 |
| 1 | 0 |
or
| 0 | 0 |
| 0 | 1 |

EQUALIZATION PATTERN
| 1/4 | 1/4 |
| 1/4 | 1/4 |

WHEN DECODING
1 → Max
(SET 1/4 Max TO ALL WHEN EQUALIZATION PATTERN)
0 → min

■ BTC(b00)=00 → DENSITY PATTERN H0 bij → | 1 | 1 |
      | 0 | 0 |
or
| 1 | 0 |
| 1 | 0 |
or
| 0 | 1 |
| 0 | 1 |
or
| 0 | 0 |
| 1 | 1 |

EQUALIZATION PATTERN
| 1/2 | 1/2 |
| 1/2 | 1/2 |

WHEN DECODING
1 → Max
(SET 1/2 Max TO ALL WHEN EQUALIZATION PATTERN)
0 → min

■ BTC(b00)=10 → DENSITY PATTERN H2 bij → | 0 | 1 |
      | 0 | 1 |
or
| 0 | 0 |
| 1 | 1 |
or
| 1 | 0 |
| 0 | 1 |
or
| 0 | 1 |
| 1 | 0 |

EQUALIZATION PATTERN
| 1/2 | 1/2 |
| 1/2 | 1/2 |

WHEN DECODING
1 → Max
(SET 1/2 Max TO ALL WHEN EQUALIZATION PATTERN)
0 → min

■ BTC(b00)=11 → DENSITY PATTERN H3 bij → | 0 | 1 |
      | 1 | 1 |
or
| 1 | 0 |
| 1 | 1 |
or
| 1 | 1 |
| 1 | 0 |
or
| 1 | 1 |
| 0 | 1 |

EQUALIZATION PATTERN
| 3/4 | 3/4 |
| 3/4 | 3/4 |

WHEN DECODING
1 → Max
(SET 3/4 Max TO ALL WHEN EQUALIZATION PATTERN)
0 → min

FIG.17

WHEN BTC(bij) = 00

| | X1 | | X2 | | X3 | PREDICTED DENSITY PATTERN H0 |
|---|---|---|---|---|---|---|
| 1: C/bij, C/C | 5: C/bij, M/C | 13: M/bij, M/M | 17: C/bij, C/C | 21: M/M, M/bij | 1 0 / 0 0 |
| 2: C/bij, C/M | 6: M/bij, C/M | 14: M/bij, M/M | 18: C/bij, C/C | 22: M/M, M/bij | 0 1 / 0 0 |
| 3: bij/C, C/M | 8: M/bij, C/C | 15: bij/M, M/M | 19: bij/C, C/C | 23: bij/M, M/M | 0 0 / 0 1 |
| 4: bij/C, C/M | 10: bij/C, M/C | 16: M/bij, M/M | 20: C/bij, C/C | 24: bij/M, M/M | 0 0 / 1 0 |
| | 7: C/bij, M/M | 9: bij/M, C/C | 11: C/bij, C/M | 12: M/bij, M/C | | |

COINCIDENCE CONDITION
C: HALF TONE CONDITION AND DENSITY DIFFERENCE $|C_{den} - bij_{Max}| < T_C$
M: HIGH RESOLUTION CONDITION AND DENSITY DIFFERENCE $|M_{Max} - bij_{Max}| < T_M$

WHEN BTC(bij) = 01

| | X1 | | X2 | X3 | PREDICTED DENSITY PATTERN H1 |
|---|---|---|---|---|---|
| | | | | | 0 1 / 1 0 |
| 1 | Q Q M / Q bij Q / M Q Q | 2 | Q Q Q / Q bij M / M Q Q | 5 | Q Q M / Q bij Q / Q M Q | 19 | C C C / C bij C / C C C | 22 | M M M / M bij M / M M M |
| 8 | M1 / bij / M1 | 9 | M1 / bij / M1 | 10 | bij / M1 / M1 | | |

COINCIDENCE CONDITION

C: HALF TONE CONDITION AND DENSITY DIFFERENCE $|C_{den}-bij_{Max}|<T_C$

M: HIGH RESOLUTION CONDITION AND DENSITY DIFFERENCE $|M_{Max}-bij_{Max}|<T_M$

M1: CONDITION OF M AND DENSITY PATTERN H1

M2: CONDITION OF M AND DENSITY PATTERN H2

Q: IT DOES NOT CORRESPOND TO C, M, M1 OR M2

FIG.20

WHEN BTC(bij) = 10

| | X1 | | X2 | PREDICTED DENSITY PATTERN H2 |
|---|---|---|---|---|
| 4 | 5 | 12 | 19 | 0 1 / 0 1 |
| 15 | 16 | 18 | 22 | |

Cell 4: Q Q M / Q bij Q / - M Q
Cell 5: Q M Q / Q bij Q / Q Q M
Cell 12: M2 / bij / M2
Cell 19: C C / C bij C / C C
Cell 15: M2 M2 / M2 / bij
Cell 16: bij / M2 / M2
Cell 18: Q / bij M1 / Q
Cell 22 (X3): M M / M bij M / M M COINCIDENCE CONDITION
C: HALF TONE CONDITION AND DENSITY DIFFERENCE $|C_{den} - bij_{Max}| < T_C$
M: HIGH RESOLUTION CONDITION AND DENSITY DIFFERENCE $|M_{Max} - bij_{Max}| < T_M$
M1: CONDITION OF M AND DENSITY PATTERN H1
M2: CONDITION OF M AND DENSITY PATTERN H2
Q: IT DOES NOT CORRESPOND TO C, M, M1 OR M2

*FIG.21*

WHEN BTC(bij) = 10

FIG.22

WHEN BTC(bij) = 11

| | X1 | | | | X2 | X3 | PREDICTED DENSITY PATTERN H0 |
|---|---|---|---|---|---|---|---|
| 1 | 2 | 3 | 4 | | | | |
| 5 | 6 | 7 | 8 | 17 | 21 | | |
| 9 | 10 | 11 | 12 | 18 | 22 | | |
| 13 | 14 | 15 | 16 | 19 | 23 | | |
| | | | | 20 | 24 | | |

COINCIDENCE CONDITION
C: HALF TONE CONDITION AND DENSITY DIFFERENCE  $|C_{den}\text{-}bij_{Max}| < T_C$
M: HIGH RESOLUTION CONDITION AND DENSITY DIFFERENCE  $|M_{Max}\text{-}bij_{Max}| < T_M$

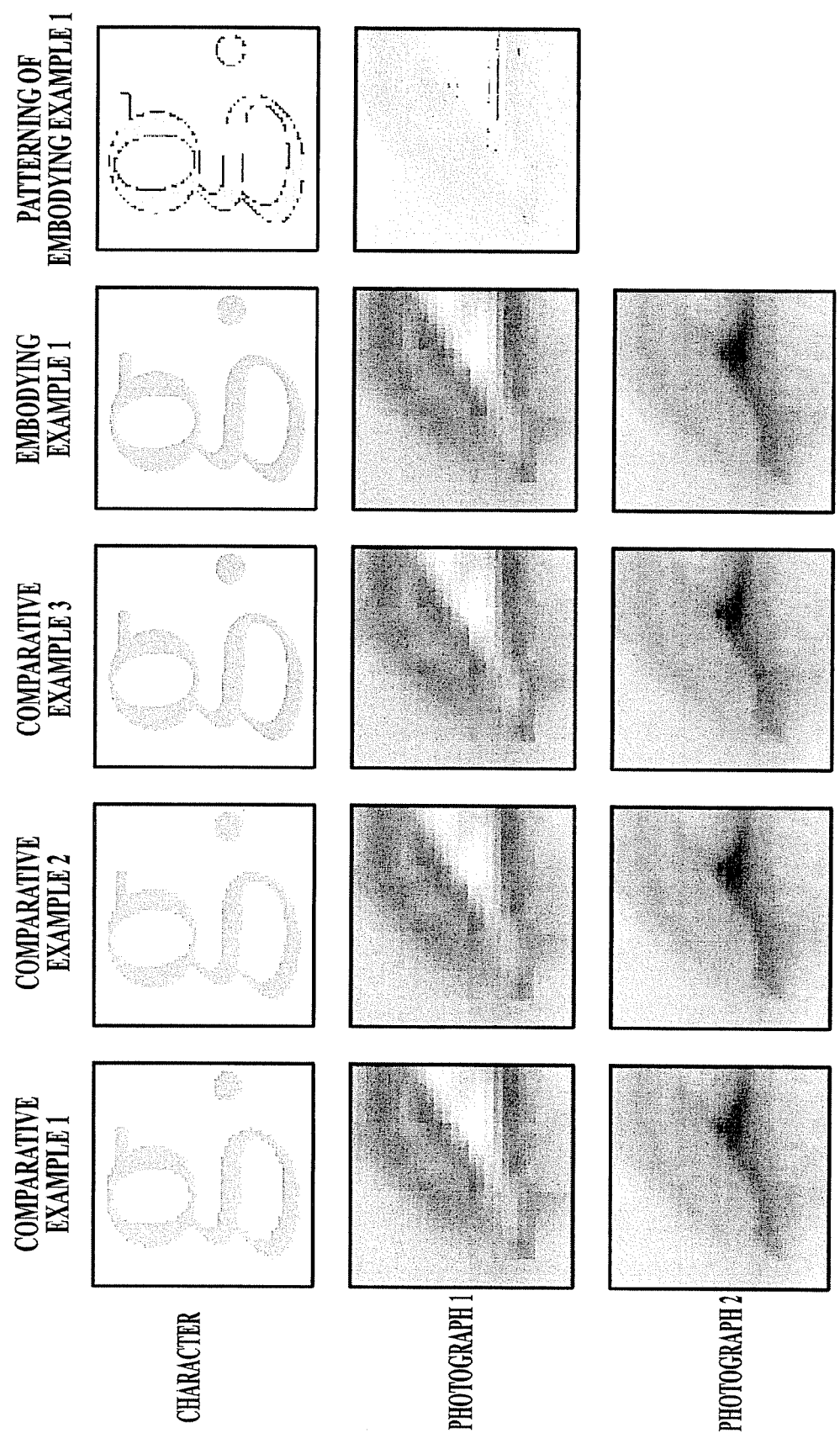

COMPRESSION METHOD, EXTENSION METHOD AND IMAGE PROCESSING APPARATUS

BACKGROUND OF THE INVENTION

1. Field of the Invention

The present invention relates to a compression method, an extension method and an image processing apparatus.

2. Related Art

Printers, and so on have a composition which stores image data written out by a rasterizing process once in a memory, and reads out from the memory one by one when required. Though a controller generates the image data by resolution of e.g. 600 dpi, it is possible to perform the resolution conversion from 600 dpi to 1200 dpi when printing and printout at a high resolution.

Also, when it is stored in the memory, generally, the compression process is performed to the image data and the amount of data is reduced. Conventionally, a BTC (Block Truncation Coding) method is provided as a compression method (For example, see Japanese Patent Laid-Open No. 11-164150). This is a method of performing coding in block unit composed of a plurality of pixels.

On the other hand, in a controller side, it is possible to generate image data of high resolution such as 1200 dpi. However, when the resolution is high, since it is necessary to increase the capacity of the memory, the cost becomes high. Though it is considered that the image data are stored after performing the resolution conversion from 1200 dpi to 600 dpi so as not to increase the capacity of the memory, the image quality deterioration will occur when the resolution conversion is merely performed.

Especially, with respect to an edge portion of a character or a line drawing, it is well known to lose sharpness because an original resolution of an image can not be maintained after performing the compression process or the resolution conversion.

SUMMARY OF THE INVENTION

It is an object of the present invention to suppress image quality deterioration by the compression process.

According to a first aspect of the present invention, there is provided a compression method of quantizing and compressing image data of an image, the method comprising the steps of:

determining a method of quantization for each pixel;

quantizing the image data in pixel unit according to the determined quantization method;

storing the quantized image data in a same region of a memory in spite of the quantization method; and storing discrimination data for discriminating the quantization method used for quantizing the image data by corresponding to the quantized image data in the memory.

Also, in accordance with a second aspect of the present invention, there is provided a compression method of quantizing image data of an image for each pixel by a BTC compression method, storing difference data to be used for decoding the quantized image data in a difference plane area of a memory and storing the quantized image data in a BTC plane area of the memory, the method comprising the steps of:

quantizing the image data by a compression method different from the BTC compression method with respect to a pixel of an image portion including at least an edge; and storing the quantized image data in the BTC plane area; and storing discrimination data for discriminating the quantization method used for the quantized image data for each pixel in the memory.

Also, in accordance with other aspect of the present invention, there is provided an extension method of decoding and extending the image data quantized by using the compression method of the first aspect of the present invention, the method comprising the step of:

decoding the quantized image data according to the discrimination data corresponding to the quantized image data.

Also, in accordance with other aspect of the present invention, there is provided the extension method of decoding and extending the image data quantized by using the compression method of the first aspect of the present invention, the method comprising the step of:

performing a resolution conversion to a same resolution of the image of the image data that is not quantized when decoding the quantized image data.

Also, in accordance with other aspect of the present invention, there is provided the extension method of decoding and extending the image data quantized by using the compression method of the first aspect of the present invention, the method comprising the step of:

performing a resolution conversion to a same resolution of the image of the image data that is not quantized with respect to pixel of the half tone area when decoding the quantized image data; and setting all of a plurality of pixels obtained by the resolution conversion to a same density value.

Also, in accordance with other aspect of the present invention, there is provided the extension method of decoding and extending the image data quantized by using the compression method of the first aspect of the present invention, the method comprising the step of:

decoding the image data in a low resolution of the image of the image data obtained by performing the resolution conversion when decoding the quantized image data with respect to pixels of the half tone area.

Also, in accordance with other aspect of the present invention, there is provided the extension method of decoding and extending the image data quantized by using the compression method of the first aspect of the present invention, the method comprising the step of:

predicting a density pattern of the same resolution before the quantizing when decoding the quantized image data with respect to the pixel of the high resolution area; and decoding the quantized image data according to the predicted density patter.

Also, in accordance with a third aspect of the present invention there is provided an image processing apparatus for quantizing and compressing image data of an image, the apparatus comprising:

a memory; and an image erosion converting section for determining a method of quantization for each pixel, quantizing the image data in pixel unit according to the determined quantization method, storing the quantized image data in a same region of a memory in spite of the quantization method, and storing discrimination data for discriminating the quantization method used for quantizing the image data by corresponding to the quantized image data in the memory.

Also, in accordance with a fourth aspect of the present invention there is provided an image processing apparatus comprising:

a memory; and an image erosion converting section for quantizing image data, of an image for each pixel by a BTC compression method, storing difference data to be used for decoding the quantized image data in a difference plane area of a memory and storing the quantized image data in a BTC plane area of the memory, wherein the image erosion converting section stores the image data quantized by a method different from the BTC compression method in the BTC plane area with respect to pixel of an image portion at least including an edge, and stores discrimination data for discriminating the quantization method used for the quantized image data for each pixel in the memory.

Also, in accordance with the third or fourth aspects of the present invention, there is provided an image processing apparatus for decoding and extending the image data quantized by using the image processing apparatus of the first aspect of the present invention, the apparatus comprising:

an image prediction converting section for decoding the quantized image data according to the discrimination data corresponding to the quantized image data.

BRIEF DESCRIPTION OF THE DRAWINGS

The above and other objects, advantages and features of the present invention will become more fully understood from the detailed description given below and the appended drawings, and the following descriptions pertain to the embodiment of the present invention are not intended to limit the present invention, and wherein:

FIG. 4 is a diagram showing an original image and a processed image before and after the compression process;

FIG. 5 is a diagram showing an example of data configurations of the processed image;

FIG. 9 is a diagram showing corresponding relationship between a density pattern and a quantum of quantization;

FIG. 16 is a diagram showing a predicted density pattern and a decoding condition;

FIG. 17 is a diagram showing corresponding relationship between templates used to prediction and predicted density patterns;

FIG. 18 is a diagram showing corresponding relationship between templates used to prediction and predicted density patterns;

FIG. 19 is a diagram showing corresponding relationship between templates used to prediction and a predicted density pattern;

FIG. 20 is a diagram showing corresponding relationship between templates used to prediction and a predicted density pattern;

FIG. 21 is a diagram showing corresponding relationship between templates used to prediction and predicted density patterns;

FIG. 22 is a diagram showing corresponding relationship between templates used to prediction and predicted density patterns;

FIG. 25 is a drawing showing process results by a compression process and an extension process.

DETAILED DESCRIPTION OF THE PREFERRED EMBODIMENTS

In the following, an example that adapted the present invention to a MFP (Multi Function Peripheral) will be described with reference to the attached drawings. The following descriptions pertain to the embodiment of the present invention and are not intended to limit the present invention.

Figure 1:
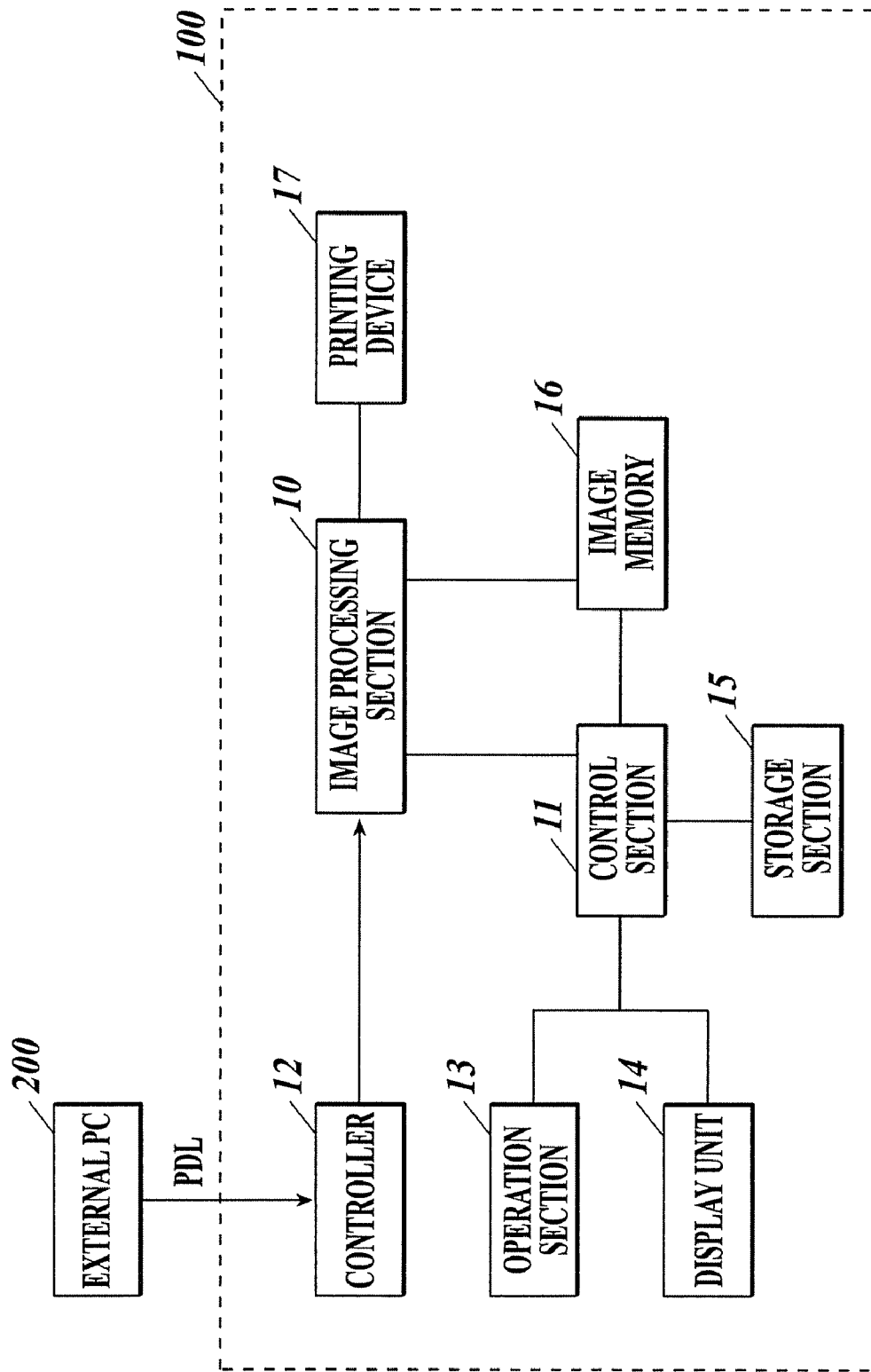
FIG. 1 is a diagram showing the functional composition of a MPF in the embodiment.

FIG. 1 shows a MFP 100.

The MFP 100 is connected to an external PC (personal computer) 200, and performs printout after performing an image process by generating image data from PDL (Page Description Language) format transmitted from the external PC 200.

As shown in FIG. 1, the MFP 100 is composed of an image processing section 10, a control section 11, a controller 12, an operation section 13, a display section 14, a storage section 15, an image memory 16, and a printing device 17.

The control section 11 performs a centralized control of each section of the MFP 100 in cooperation with various kinds of control programs stored in the storage section 15.

The controller 12 generates image data in pixel unit by a rasterizing process.

Specifically, since data of a document prepared by the external PC 200 is converted to a PDL form by printer driver software and transmitted to the controller 12, the controller 12 generates data of an image (image data) in pixel unit by the rasterizing process. In the rasterizing process, a PDL command is analyzed, the image data of each color of C (cyan), M (magenta), Y (yellow), and K (black) are generated in image unit (referred to as object) to be drawn. That is, pixels are assigned with respect to an object to be drawn, and the image data are generated by setting a data value to each assigned pixel.

The operation section 13 is used to input operation instructions by an operator, and composed of a touch panel integral with various keys or the display section 14, and so on. The operation section 13 generates control signal corresponding to the operations, and outputs it to the control section 11.

The display section 14 displays operation screens, and so on according to controls of the control section 11 on a display.

The storage section 15 stores various control programs and parameters necessary for processes or setting data, and so on.

The image memory 16 is a memory for storing the data of the image.

The printing device 17 performs printout based on images for printing inputted from the image processing section 10. The images for printing are generated by performing necessary image processes to images generated by the printer controller 12 by the image processing section 10.

The printing device 17 performs printout by an electrophotographying system, and is composed of e.g. a feeding section, an exposure section, a development section, a fixing section, and so on. When printing, the exposure section irradiates a laser beam on a photosensitive drum based on the data of the image, and forms an electrostatic latent image. Then, toners are deposited by the development section, and the toner image is formed. Further, the toner image is transferred on a sheet feed from the feeding section and fixed on the sheet by the fixing section.

Next, in view of FIG. 2, the image processing section 10 relating to this embodiment will be described.

The image inputted from the controller 12 is stored once in the image memory 16 and outputted to the printing device 17 by reading it out from the image memory 16 when there is a printing instruction. The image processing section 10 performs a compression process to the image when the image is stored in the image memory 16, and a resolution conversion to a low resolution is performed. On the other hand, an extension process is performed to the image read out from the image memory 16, and a resolution conversion which returns to an original resolution is performed. Then, various image processes such as a γ correction process or a screen process, and so on is performed, and the image for printing is generated and outputted to the printing device 17.

Figure 2:
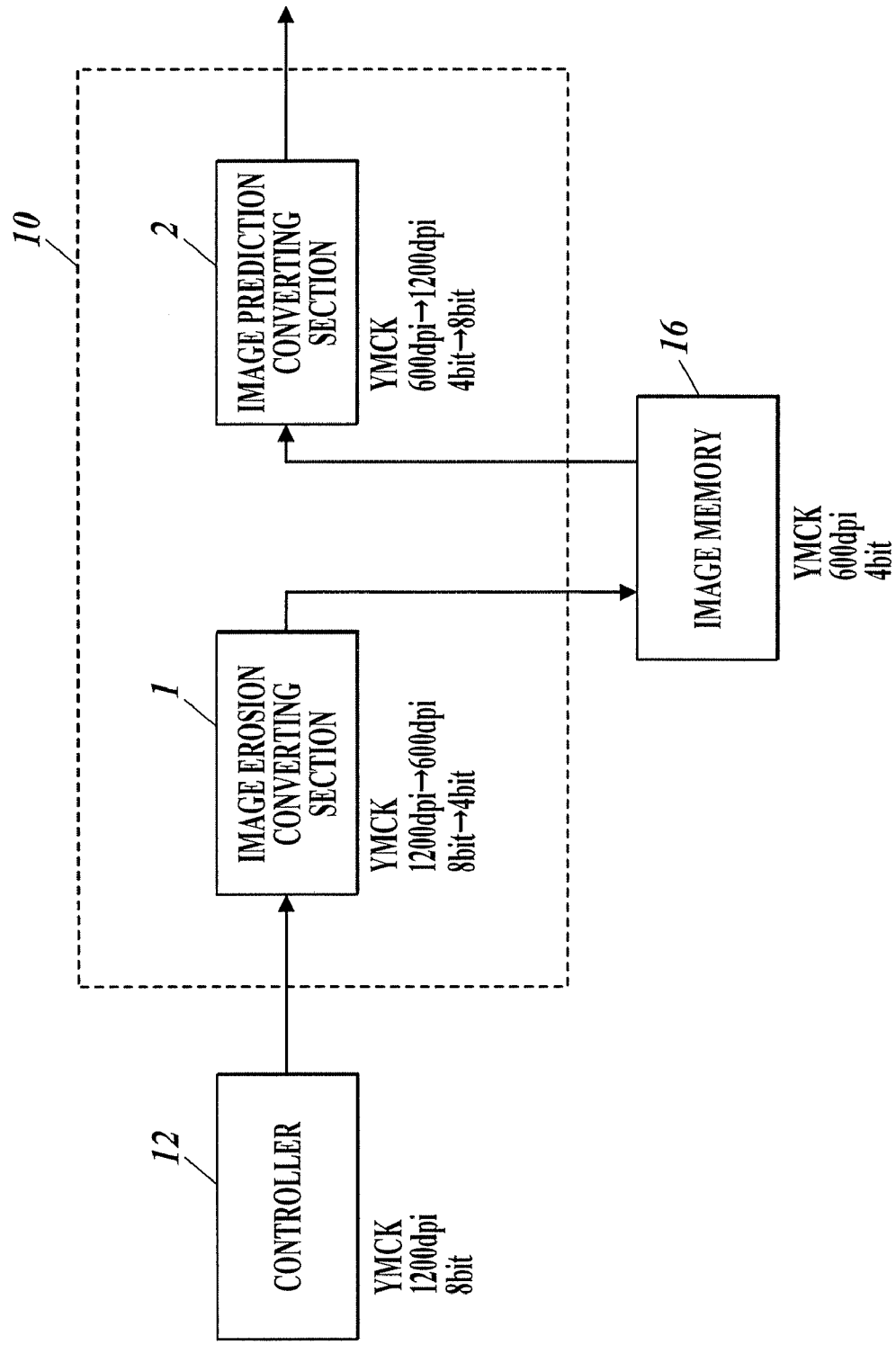
FIG. 2 is a diagram showing the composition parts which mainly function at the time of processes of compression and extension in the composition parts of an image processing section shown in FIG. 1.

FIG. 2 is a diagram showing an image erosion converting section 1 and an image prediction converting section 2 that are composition parts which mainly function at the time of processes of compression or extension. Here, an example in a case that image data composed of resolution 1200 dpi, 1 pixel and 8 bits are generated with respect to each color of CMYK in the controller 12 is explained.

Figure 3:
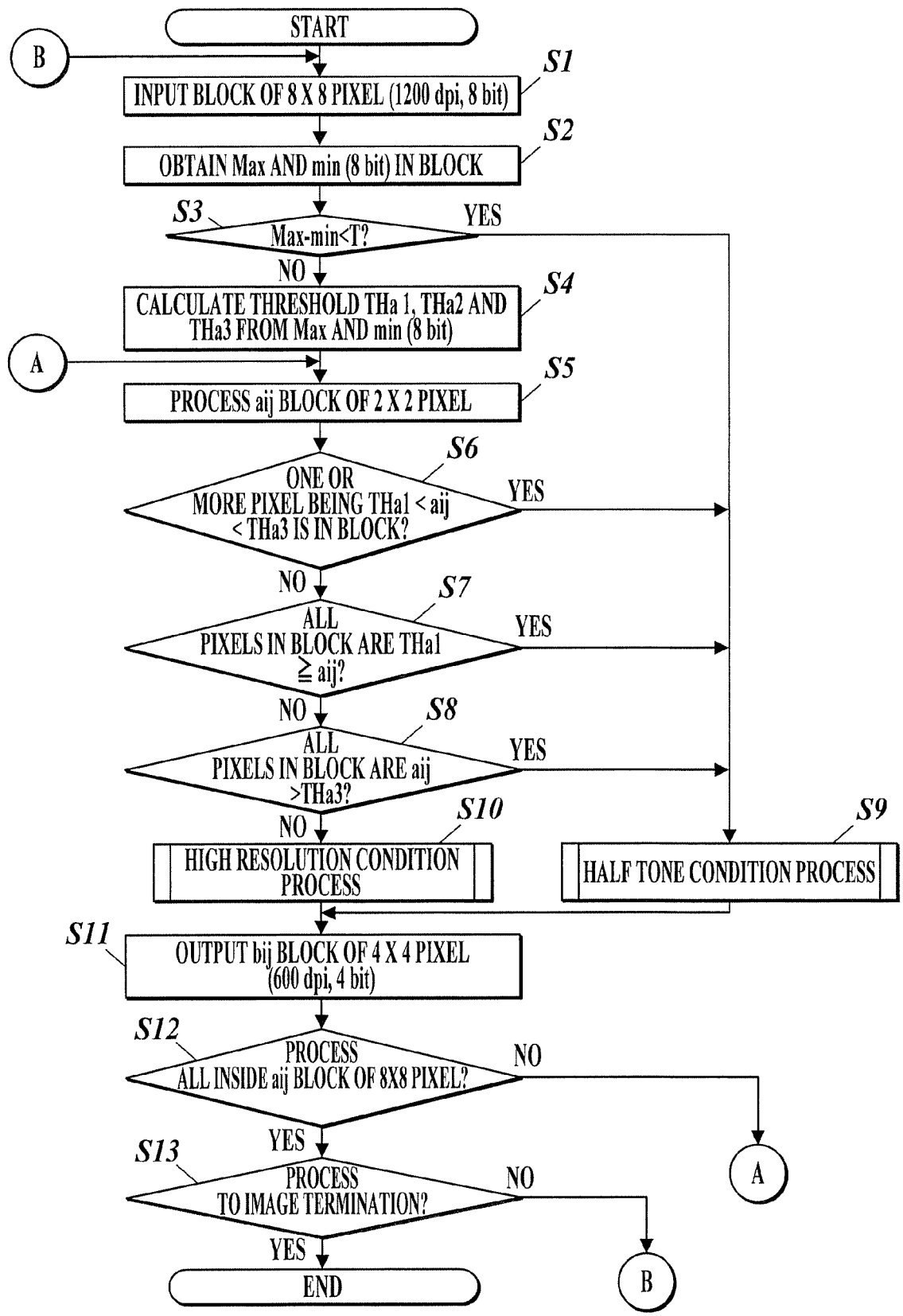
FIG. 3 is a flowchart showing a flow of processes at the time of the compression process.

First, the compression process to be performed by the image erosion converting section 1 is explained in view of FIG. 3.

As shown in FIG. 4, the image erosion converting section 1 performs quantization to the generated image data, and converts data of 8 bits to data of 4 bits with respect to 1 pixel to compress it. The compression process is performed in block unit of 8×8 pixels. Also, when performing the quantization, the resolution conversion is performed by changing resolution 1200 dpi to 600 dpi. The image memory 16 stores the compressed and resolution converted image data.

FIG. 5 shows data configurations of the processed image (600 dpi, 4 bits, 4×4 pixels) obtained by performing the compression and the resolution conversion to the original image (1200 dpi, 8 bits, 8×8 pixels) shown in FIG. 4.

As shown in FIG. 5, the processed image is composed of data of 4 bits, and areas for storing the processed image are formed in the image memory 16. That is, four data layers for 4×4 pixels (referred to as plane) are formed by 1 bit per 1 pixel.

In 0 to 1st bit, the data value BTC(bij) (2 bits) of the processed image are stored. The data layers of 0 to 1st bit are called the BTC plane.

In 2nd bit, data value flag(bij) (1 bit) of discrimination flag is stored. The discrimination flag is discrimination data for discriminating a quantization method used for each pixel. In this embodiment, since the quantization method is determined so as to correspond to a half tone area or a high resolution area, the discrimination flag is data indicating any pixel in the half tone area or the high resolution area. The half tone area and the high resolution area will be described later. The data layer of the 2nd bit is called the discrimination plane.

In the 3rd bit, The maximum value and the minimum value (each 8 bits) in a block of 8×8 pixels of the original image are stored. In FIG. 5, the maximum value is represented as Max(k), and the minimum value is represented as min(k) (k indicates bit position. $0 \leq k \leq 7$). The data value of 8 bits are stored in a position set by k among 4×4 pixels by a bit position. The data layer of 3rd bit is called difference plane.

Next, a flow of the compression process will be described.

As shown in FIG. 3, first, when an image is extracted in block unit of 8×8 pixels from image (1200 dpi, 8 bits) generated by the controller 12, and inputted (step S1), the maximum value Max and the minimum value min are obtained from the data value which pixel in the block has (step S2). Since the data value which the pixel has indicates a density value after printing, Max becomes the maximum density value in 8×8 pixels and min becomes the minimum density value.

In an example shown in FIG. 4, each pixel of the original image (1200 dpi, 8 bits) is represented as aij ($0 \leq i \leq 7$, $0 \leq j \leq 7$), and each pixel of the processed image (600 dpi, 4 bit) after processing is represented as bij ($0 \leq i \leq 3$, $0 \leq j \leq 3$). Hereinafter, data values which pixels of aij and bij have are often represented by aij and bij. In the original image, Max is the maximum value in data values of aij and min is the minimum value of aij. In addition, The Max and min in the original image are also Max and min of the processed image.

After that, though the quantization is performed, a different quantization method is selected according to whether each pixel is a pixel of a half tone area or a pixel of a high resolution area. The half tone area is an image area in which it is not especially necessary to maintain the high resolution. For example, the half tone area is an image portion having density of halftone or an image portion having density of same degree when the image portion is not halftone. The high resolution area is an image area in which it is necessary to maintain the high resolution. For example, the high resolution area is an image portion such as an edge portion of an object, a thin line structure, an isolated point, and so on. In the high resolution area, the resolution is important in comparison with the gradation. In contrast, in the half tone area, the gradation is important in comparison with the resolution. According to this, since the image quality required according to characteristics of an image is different, the image is separated to the high resolution area and the half tone area, and different methods are performed respectively.

Accordingly, the image erosion converting section 1 judges whether the half tone condition is satisfied or the high resolution condition is satisfied in the original image. The judgment is performed in 2×2 pixel unit which corresponds to bij of 1 pixel in the processed image. Also, when the judgment is performed, threshold values THa1 to Tha3 represented by the following formulas are calculated and used.

$$THa1 = min + (Max - min) \times 1/6$$

$$THa2 = min + (Max - min) \times 3/6$$

$$THa3 = min + (Max - min) \times 5/6$$

Then, when any of the half tone conditions (1) to (4) shown below is satisfied, it is judged that aij of 2×2 pixels is a pixel of the half tone area when pixel satisfying THa1<aij≦THa3 is at least one in four pixel aij,     (1)

when all of four pixels aij satisfy aij≦THa1,  (2)

when all of four pixels aij satisfy aij>THa3, or  (3)

when Max−min<$T(0≦T≦255)$ is satisfied.  (4)

T is a difference between Max and min, that is, a threshold value set to judge whether a density width is small or not. For example, it is possible to set a value such as T=30, and so on.

According to the half tone conditions (1) to (4), it is judged whether any of the four pixels aij has a density of halftone, whether all of the four pixels aij have the maximum value or a value near the minimum and a density of same degree, or whether density change is small, and it is judged whether the four pixels aij is the pixels of the half tone area or not.

On the other hand, when the high resolution condition (1) shown below is satisfied, aij of 2×2 pixels is judged as pixels of the high resolution area.

in the four pixels aij, when pixel satisfying aij≦THa1 and pixel satisfying aij>THa3 are present in a mixed state.  (1)

That is, according to the high resolution condition (1), in the four pixels aij, it is judged whether the density change is large or not, and it is judged whether the four pixels aij are pixels of the high resolution area.

In a flow of the processes, first, it is judged whether (Max−min)<T is satisfied (step S3), when this condition is satisfied (step S3, Y), it is judged that the half tone condition (4) is satisfied. Then, the step moves to a half tone condition process (step S9). When (Max−min)<T is not satisfied (step S3, N), the threshold values of THa1 to THa3 are calculated (step S4). When aij of 2×2 pixels e.g. a00, a01, a10 and a11 at an upper left of the original image in FIG. 4 are noted (step S5), the step moves to the half tone condition process (step S9) because one of the half tone conditions (1) to (3) is satisfied (i) when any one of a00, a01, a10 and all satisfies THa1<aij≦THa 3 (step S6, Y) (ii) when all of a00, a01, a10 and a11 satisfies aij≦Tha1 (step S7, Y), or (iii) when all of a00, a01, a10 and a11 satisfies aij>THa3 (step S8, Y).

On the other hand, when all of the half tone conditions (1) to (4) are not satisfied (step S6, N; S7, N; S8, N), that is, in a00, a01, a10 and a11, when the pixel satisfying aij≦THa1 and the pixel satisfying aij>THa3 is present in a mixed state, it is judged that the high resolution condition (1) is satisfied, and the step moves to the high resolution condition process (step S10).

Figure 6:
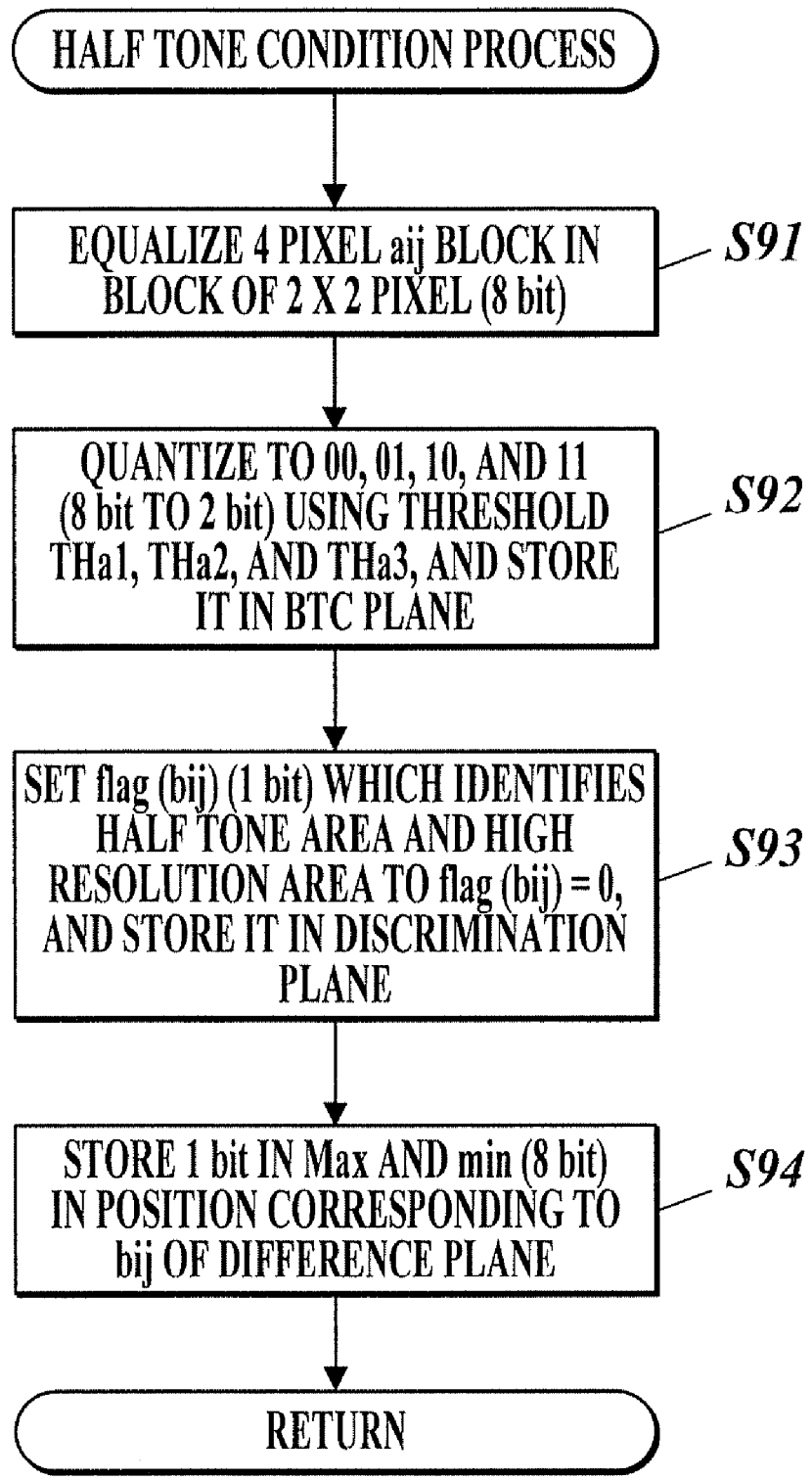
FIG. 6 is a flowchart showing a flow of a half tone condition process.

First, the half tone condition process is explained in view of FIG. 6.

As shown in FIG. 6, a quantization is performed by the BTC compression method with respect to aij of 2×2 pixels satisfying the half tone condition. First, data values of aij of 2×2 pixels are averaged to obtain an average value avr(bij) (step S91). In an example of a00, a01, a10 and a11, the average is avr(b00)=¼×(a00+a01+a10+a11). After that, the average value avr(bij) of 8 bits is quantized to data value BTC(bij) of 2 bits of 00, 01, 10 and 11 using threshold values of THa1, THa2 and THa3 (step S92).

The quantization is performed according to the following conditions.

BTC(*bij*)=00 when min≦avr(*bij*)<*THa*1

BTC(*bij*)=01 when *THa*1≦avr(*bij*)<*THa*2

BTC(*bij*)=10 when *THa*2≦avr(*bij*)<*THa*3

BTC(*bij*)=11 when *THa*3≦avr(*bij*)≦Max

Figure 7:
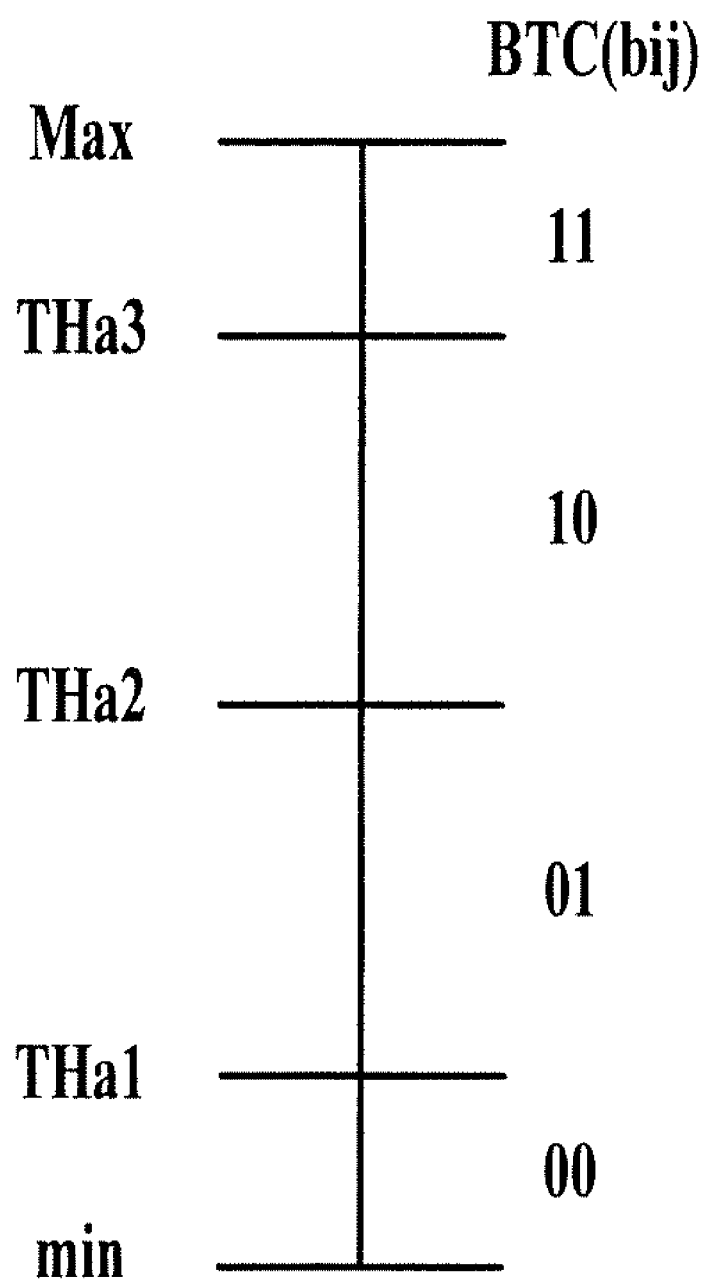
FIG. 7 is a diagram showing conditions of quantization at the time of BTC compression.

That is, as shown in FIG. 7, by the BTC compression method, the quantization to data value of 2 bits is performed according to whether avr(bij) belongs to any one of the density range defined by Max, min, THa1 THa2 and THa3. Thereby, the quantization level is compressed from 8 bits to 2 bits.

The data value BTC(bij) being 2 bits becomes the data value of 1 pixel bij of the processed image. That is, since it is considered that the densities of the image portion satisfying the half tone condition are same degree, the resolution conversion is performed by performing the quantization and averaging four pixels of a00, a01, a10, a11 corresponding to the pixel of b00.

After that, the data value flag(bij) of the discrimination flag is set to flag(bij)=0 indicating that the pixel is the half tone area. Then, it is stored in a position corresponding to bij in the discrimination plane (see FIG. 5). After that, 1 bit data of a bit position corresponding to bij in the data values of Max or min are stored in a position corresponding to bij of the difference plane (see FIG. 5) (step S94).

For example, when the data value of BTC(00) is obtained with respect to pixel of b00, the data value of 0 is stored in the position of flag(b00) of the discrimination plane and the data value 7th bit of min is stored in the position corresponding to b00 of the difference plane.

When the above mentioned processes are ended, the step moves to the process of step S11 in FIG. 3.

Figure 8:
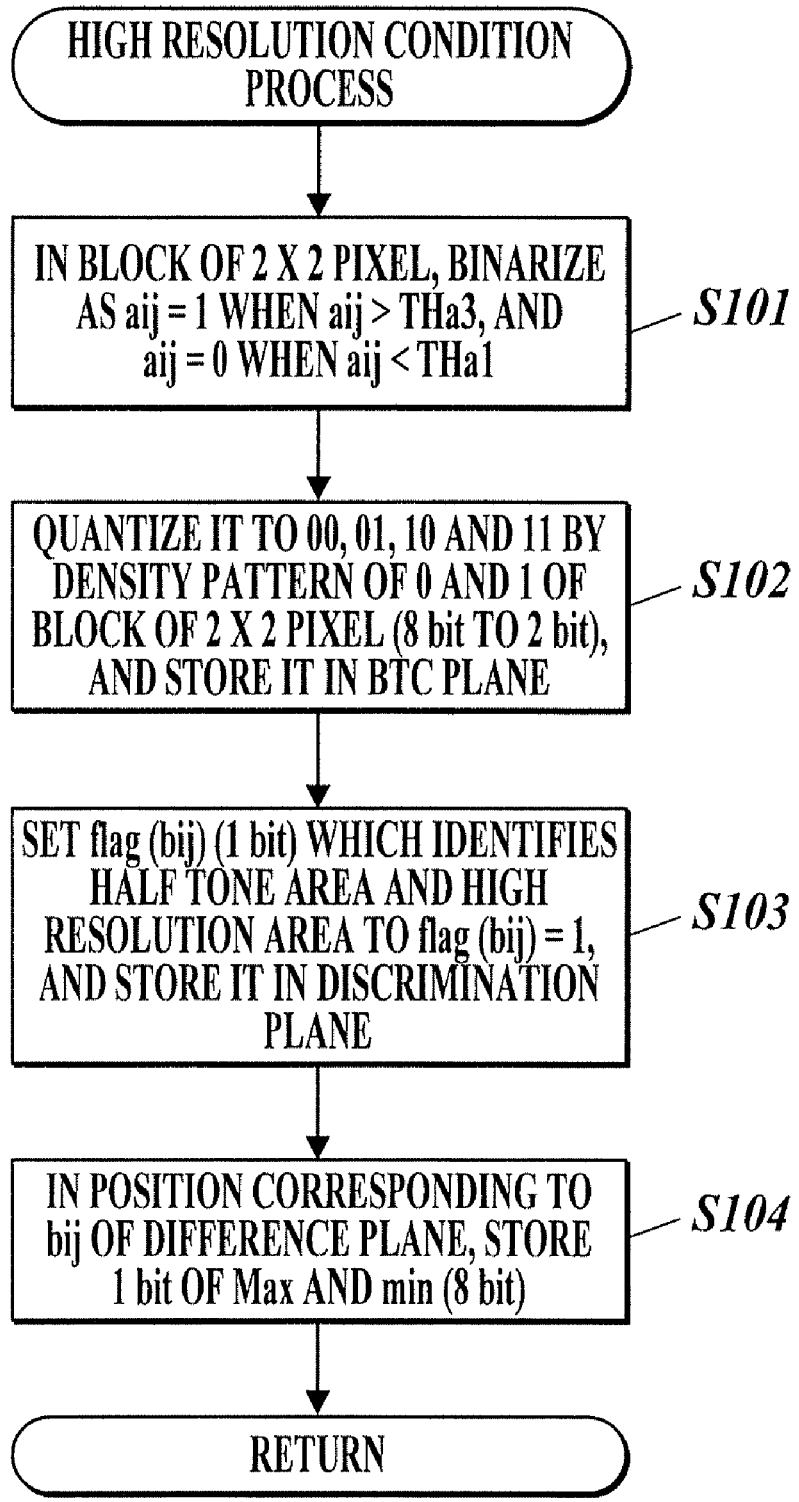
FIG. 8 is a flowchart showing a flow of a high resolution condition process.

Next, in view of FIG. 8, the high resolution condition process will be described.

In the high resolution condition process, aij of 2×2 pixels is patterned to a density pattern, and the quantization is performed according to the density pattern.

First, each data value of aij of 2×2 pixels is binarized to a value of 0 and 1 according to the following conditions (step S101).

aij=1 when aij>THa3 aij=0 when aij<THa1

When the high resolution condition is satisfied, the pixel being aij=1 is near the maximum value Max, the pixel being aij=0 is near the minimum value min, and a pattern of 0 and 1 indicates the density pattern of the image portion of aij of 2×2 pixels. Accordingly, the quantization to the data value BTC (bij) of 2 bits of 00, 01, 10 or 11 is performed by the density pattern of 0 and 1 in the block of aij of 2×2 pixels (step S102). The quantization is performed by converting it to quantum 00, 01, 10 or 11 assigned for each of a, plurality of density patterns. Here, as shown in FIG. 9, an example in a case that density patterns are classified to four groups of H0 to H3 and quantum 00, 01, 10 or 11 is assigned to each group is explained.

As shown in FIG. 9, a group of the density pattern H0 has only one pixel being aij=1 in aij of 2×2 pixels. In this case, the quantization to BTC(bij)=00 is performed. Also, a group of density pattern H1 has two pixels being aij=1, and corresponds to a predetermined pattern shown in FIG. 9. In this case, the quantization to BTC(bij)=01 is performed. Though a group of density pattern H2 has two pixel being aij=1 like the density pattern H1, the group of density pattern H2 corresponds to a predetermined pattern different from the density pattern H1 and the quantization to BTC(bij)=10 is performed. A group of density pattern H3 is a pattern of three pixels being aij=1, and the quantization to BTC(bij)=11 is performed.

When decoding, a density pattern is predicted from the data value of BTC(bij) after quantization. However, as above mentioned, it is possible to represent it by the same density in 2×2 pixel area even if the prediction is error by setting the density patterns being same density (the number of 0 and 1 is same) of 2×2 pixels to a same group and performing the quantization. That is, it is effective in being hard to visually appear as image quality deterioration even if the error occurs.

In addition, it is possible to classify the groups to one or more density pattern by a sequence position, and so on of 0 and 1 without using the density and to assign quantum to each group.

Next, the data value flag(bij) of the discrimination flag is set to flag(bij)=1 indicating pixel in the high resolution area, and it is stored in the discrimination plane shown in FIG. 5 (step S103). After that, 1 bit data of a bit position corresponding to bij from the data value of Max or min is stored in a position corresponding to bij of a difference plane shown in FIG. 5 (step S104).

When the above mentioned processes are ended, the step moves to the process of step S11 in FIG. 3.

It returns to FIG. 3, and the process of step S11 is explained as follows.

In step S11, the processed image (600 dpi, 4 bits) of bij of 4×4 pixels obtained by the half tone condition process or the high resolution condition process is outputted to the image memory 16.

After that, whether the half tone condition process or the high resolution condition process is ended or not is judged with respect to all in blocks of aij of 8×8 pixels of the original image (step S12). The step moves to step S5 when the process is being performed, the process of steps S5 to S11 are repeated with respect to other unprocessed aij of 2×2 pixels in the blocks of aij of 8×8 pixels.

When the processes are ended with respect to all in the blocks of aij of 8×8 pixels (step S12, Y), whether the processes to the termination of the original image are ended or not is judged (step S13). when the processes are not ended (step S13, N), it returns to step S1, and the processes of the steps S1 to S13 are repeated with respect to the block of aij of other unprocessed 8×8 pixels in the original image. When the processes are ended to the termination of the original image (step S13, Y), this process is ended.

Next, in view of FIG. 10, the processes of the image prediction converting section 2 will be described.

Figure 11:
FIG. 11 is a diagram the processed image and a restored original image before and after the extension process.

As shown in FIG. 11, the image prediction converting section 2 decodes the processed image inputted from the image memory 16, and converts and extends it to data of 4 bits per 1 pixel to data of 8 bits. The extension process is performed in block unit of 4×4 pixels (bij) corresponding to 8×8 pixels (aij) being process unit at the time of compression. Also, when decoding, the resolution conversion from resolution 600 dpi to 1200 dpi is performed.

Figure 10:
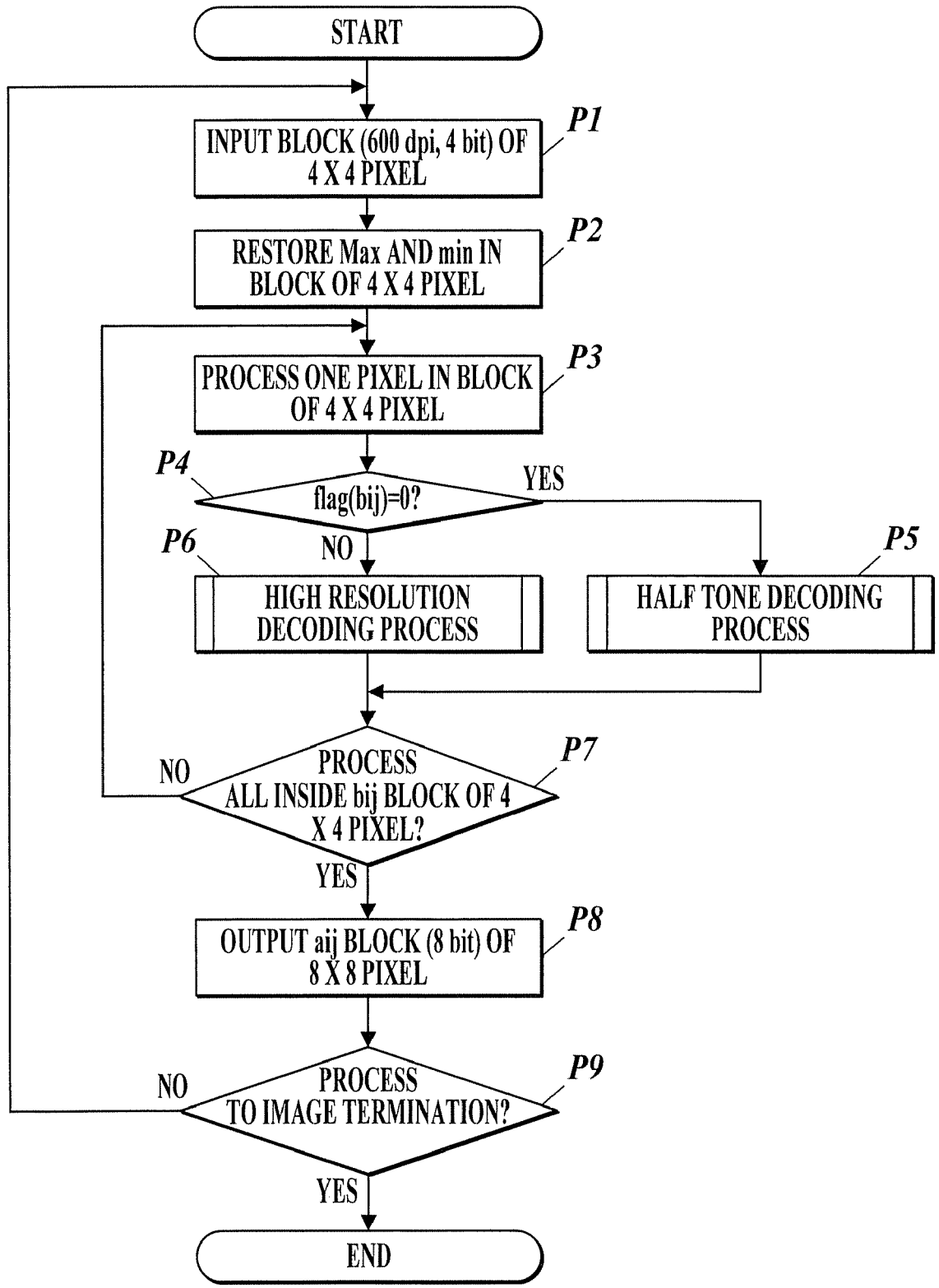
FIG. 10 is a flowchart showing a flow of process at the time of the extension process.

As shown in FIG. 10, first, when the processed image is inputted in block unit of bij of 4×4 pixels (step P1), Max(k) and min(k) are obtained respectively from the difference plane of the processed image and arranged in a bit order, and data of Max and min are restored (step P2). After that, 1 pixel bij in the block of 4×4 pixels is noted to decode the original image 1 pixel by 1 pixel (step P3).

Then, flag(bij) is referred with respect to the attention pixel bij. When flag(bij)=0 satisfied (step P4, Y), since the quantization method corresponding to the half tone area is used at the time of the compression process with respect to the attention pixel bij, a half tone decoding process is performed (step P5), and the decoding corresponding to the quantization method is performed. On the other hand, when flag(bij)=1 is satisfied (step P4, N), since the quantization method corresponding to the high resolution area is used at the time of the compression process with respect to the attention pixel bij, a high resolution decoding process is performed (step P6), and the decoding corresponding to the quantization method is performed.

Figure 12:
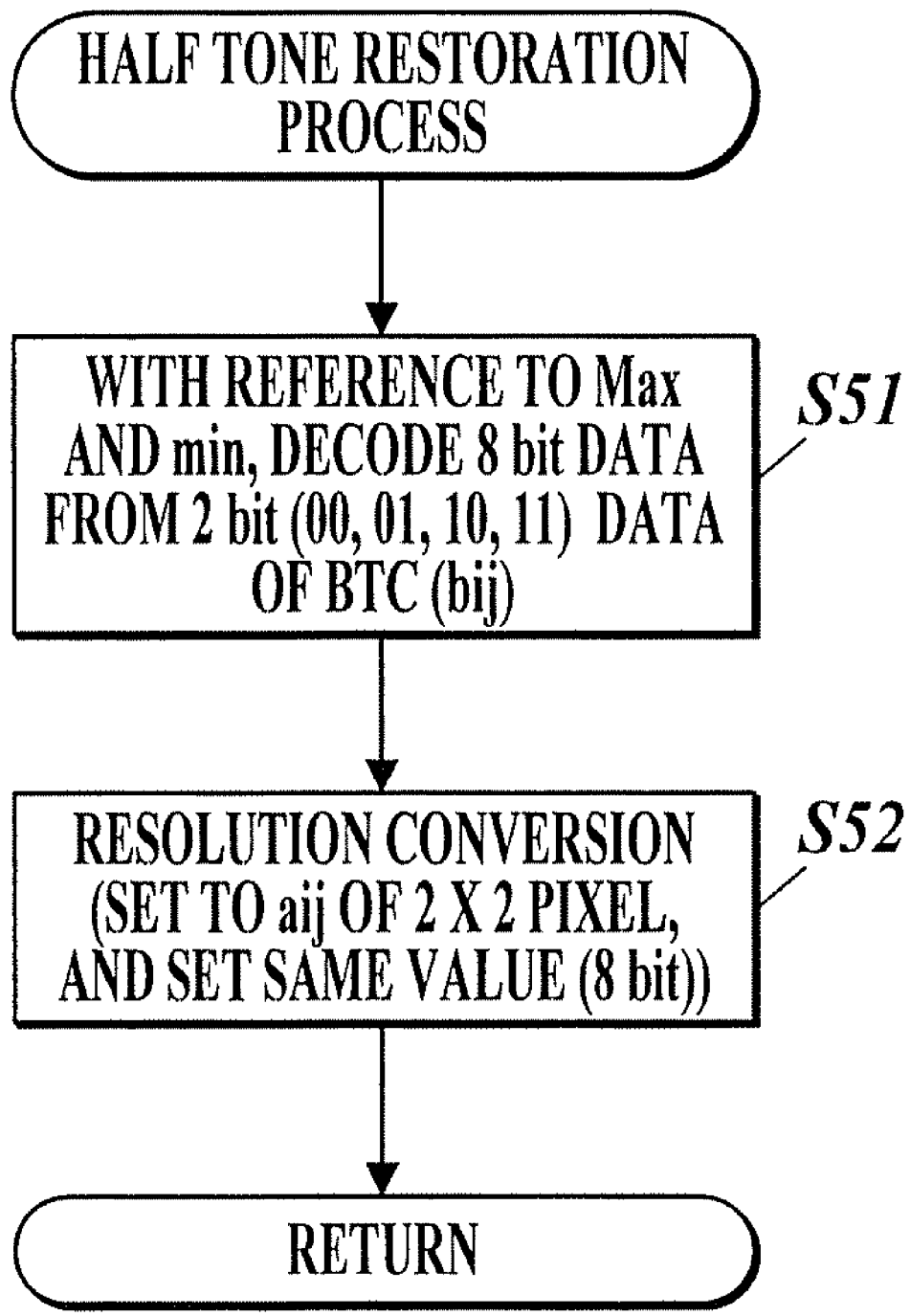
FIG. 12 is a flowchart showing a flow of a half tone decoding process.

First, in view of FIG. 12, the half tone decoding process will be described.

In the half tone decoding process, using the restored data of Max and min, data of BTC(bij) of 2 bits is decoded by the BTC extension method and extended to data of 8 bits (step P51). When decoding, the resolution conversion is performed by dividing bij of 1 pixel to aij of 2×2 pixels, data of 8 bits obtained by extending it are assigned respectively to aij of each pixel. That is, all of the decoded data value of aij of 2×2 pixels becomes the same value (step P52).

For example, when the resolution conversion from 1 pixel of b00 to four pixels of a00, a01, a10, a11 is performed, the extension process is performed according to the following conditions.

When BTC(*b*00)=00, *a*00=*a*01=*a*10=*a*11=min

When BTC(*b*00)=01, *a*00=*a*01=*a*10=*a*11=min+ (Max−min)×⅓

When BTC(*b*00)=10, *a*00=*a*01=*a*10=*a*11=min+ (Max−min)×⅔

When BTC(*b*00)=11, *a*00=*a*01=*a*10=*a*11=Max

Figure 13:
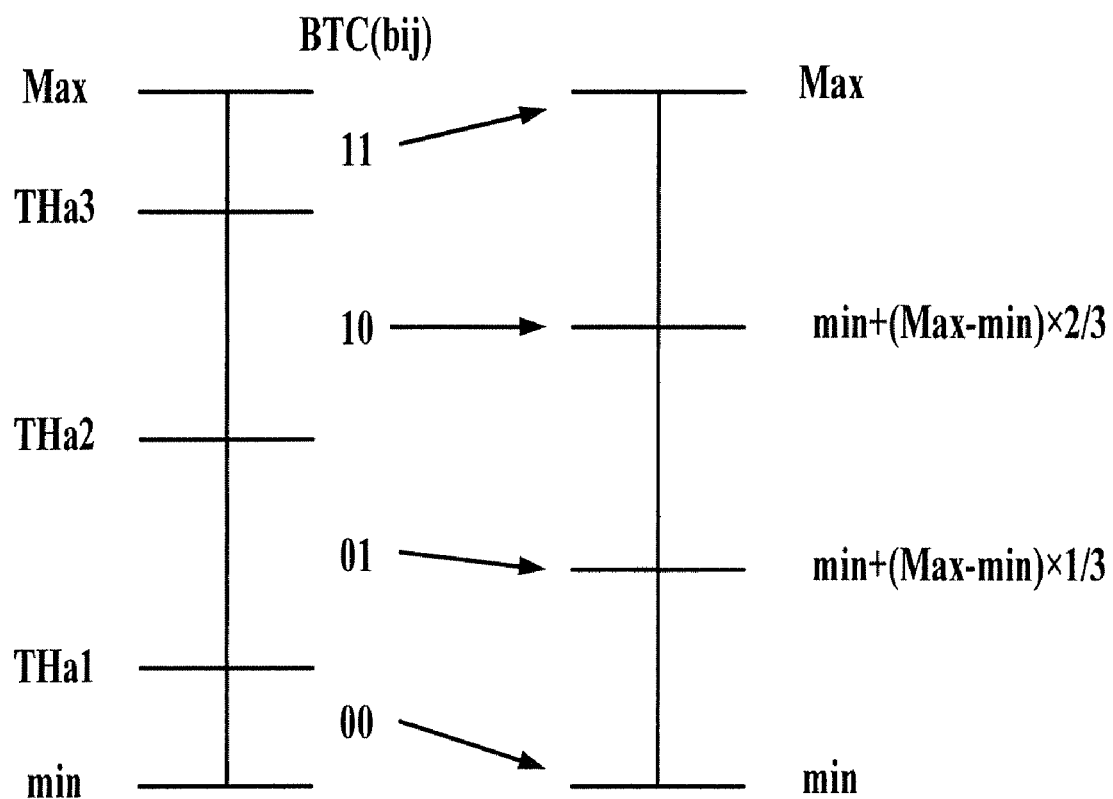
FIG. 13 is a diagram showing decoding conditions at the time of BTC extension.

That is, as shown in FIG. 13, it is decoded to density values which divided the density range defined by Max and min into three equally.

After decoding, the step moves to the process in step P7 in FIG. 10.

Next, in view of FIG. 14 and FIG. 15, the high resolution decoding process will be described.

With respect to the high resolution area satisfying the high resolution condition, the quantization is performed by the density pattern of 1 and 0 of aij of the original image. When the quantization is performed, since the value (00, 01, 10, 11) of BTC(bij) is assigned by performing the group division for each of a plurality of density patterns, some density patterns corresponding to the data values BTC(bij) shown in FIG. 16 should be considered when this is decoded to the original data of 8 bits. In the high resolution decoding process, the decoding is performed by predicting that the original image was which density pattern.

The prediction of density pattern is performed using templates.

FIG. 17 is a diagram showing corresponding relationship between templates used when BTC(bij)=00 is satisfied and density patterns predicted by using the templates. The identification numbers (the number of upper left of the templates) are assigned to each template.

C and M shown in each template are parts of the conditions coincident with the templates.

C indicates that it is judged as coincident when the pixel of the position of C satisfies the half tone condition and the density difference between the pixel of position of C and the attention pixel bij satisfies $|C_{den} - bij_{Max}| < T_C$. The $C_{den}$ is a value obtained by decoding the data value (2 bits) of the pixel of position of C to 8 bits by conditions shown in FIG. 13. That is, if the pixel of position of C is BTC (bij)=00, "$C_{den}$=min" is set, if the pixel of position of C is BTC(bij)=01, "$C_{den}$=min+ (Max−min)×⅓" is set, if the pixel of position of C is BTC (bij)=10, "$C_{den}$=min+(Max−min)×⅔" is set, and if the pixel of position of C is BTC(bij)=11, "$C_{den}$=Max" is set. The $bij_{Max}$ indicates Max value in the block (bij of 4×4 pixels. Hereinafter the same shall apply) at the time of BTC compression belonging to the attention pixel bij.

M indicates that it is judged as coincident when the pixel of the position of M satisfies the high resolution condition and the density difference between the pixel of position of M and the attention pixel bij satisfies $|M_{Max}-bij_{Max}|<T_M$. The $M_{Max}$ is Max value in the block at the time of BTC compression to which the pixel of the position of M belongs, and the $bij_{Max}$ is Max value in the block at the time of BTC compression to which the attention pixel bij belongs. Since it becomes $M_{Max}=bij_{max}=Max$ when the pixel of the position of M and the attention pixel bij belong to the same block, the density difference is 0.

In addition, $T_C$ and $T_M$ are threshold values used to judge whether the density difference is small or not. For example, it is possible to set it to $T_C=30$, $T_M=35$, and so on. Also, it is possible to set different values or a same value to $T_C$ and $T_M$. The density pattern having a small density difference of densities being same degree between the pixel of the position of C or M and the attention pixel bij is predicted by comparing it with $T_C$ and $T_M$.

Figure 18:
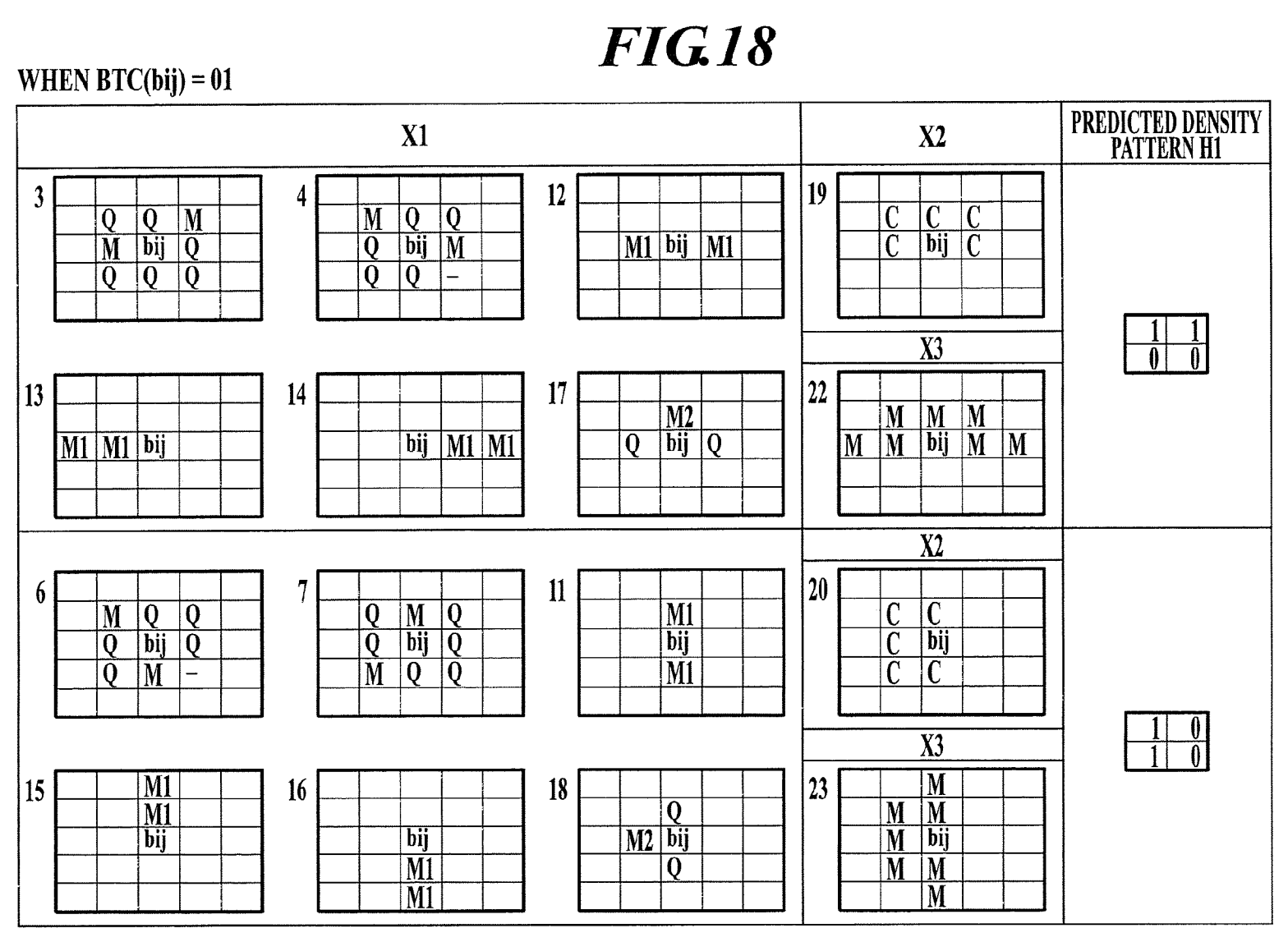
Figure 21:
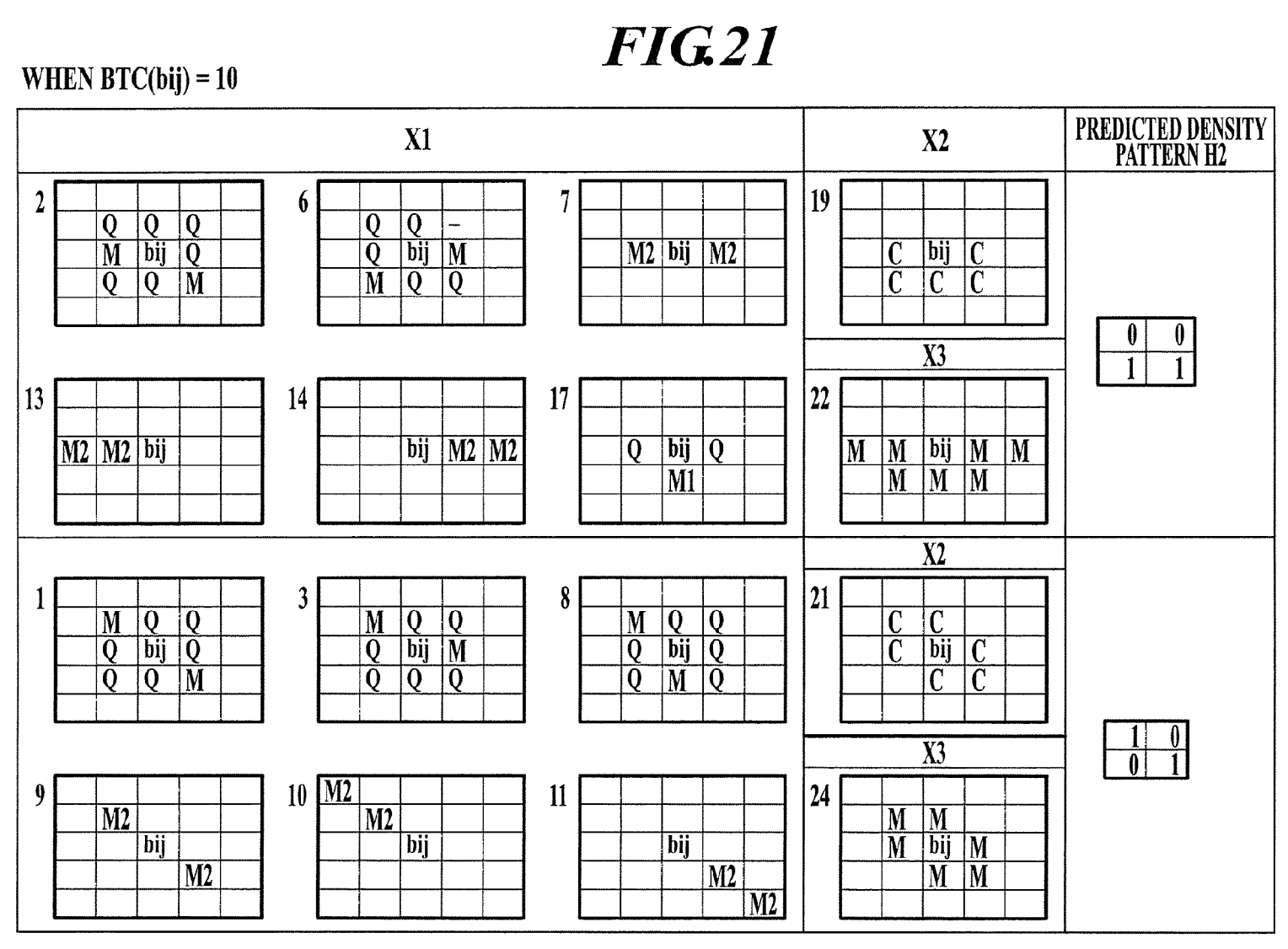

In the same manner, FIG. 18 and FIG. 19 are diagrams each showing corresponding relationship between templates used when BTC(bij)=01 is satisfied and the predicted density pattern(s), FIG. 20 and FIG. 21 are diagrams each showing corresponding relationship between templates used when BTC(bij)=10 is satisfied and the predicted density pattern(s), and FIG. 22 is a diagram showing corresponding relationship between templates used when BTC(bij)=11 is satisfied and the predicted density patterns.

In FIG. 18 to FIG. 21, the coincidence conditions of M1 are that the pixel of position of M1 satisfies conditions of M and corresponds to the density pattern H1. That is, it is a, condition that the pixel of position of M1 satisfies BTC(bij)=01.

The coincidence conditions of M2 are that the pixel of position of M2 satisfies conditions of M and corresponds to the density pattern H2. That is, it is a condition that the pixel, of position of M2 satisfies BTC(bij)=10.

Also, the coincidence conditions of Q is judged as coincident when the pixel of position of Q does not satisfy any of the coincidence conditions of C, M, M1 and M2.

Each template is classified into three groups of X1, X2 and X3. These are prepared to perform prediction in three stages. First, when it is not coincident with any of the templates of X1 group as a result of matching, the matching to the templates of X2 group is performed. Next, when it is not coincident with any of the templates of X2 group as a result of matching, the matching to the templates of X3 group is performed.

In the templates of X1 group, it is judged as coincident when all conditions of C, M, and so on defined in the template are satisfied. On the other hand, in the templates of X2 and X3, it is not judged whether all coincidence conditions are satisfied, how the coincidence conditions are satisfied is evaluated and it is judged as coincident according to an evaluation result. Specifically, in X2 group, the matching is performed once with respect to all of the templates of X2 group, and the number of pixels satisfying the coincidence conditions of C, M, and so on is counted with respect to each of the templates. This is the evaluation value. Then, it is judged as coincident with the template of which the evaluation value is the maximum.

These templates are used to predict a density pattern of the attention pixel bij from a shape of edge included in the original image or the thin line structure, and so on. Since the edge shape can be specified from the density pattern of peripheral pixels of the attention pixel bij, the template defines conditions of the peripheral pixel when it is the edge shape as coincidence conditions such as C, M, and so on.

Especially, in X1 group, the templates are designed so as to predict the density pattern when the attention pixel bij is a pixel of the thin line structure necessary for maintaining the high resolution. In X2 and X3 groups, the templates are designed so as to widely predict the edge shape, and so on as loose conditions in comparison with X1 group.

Figure 23A:
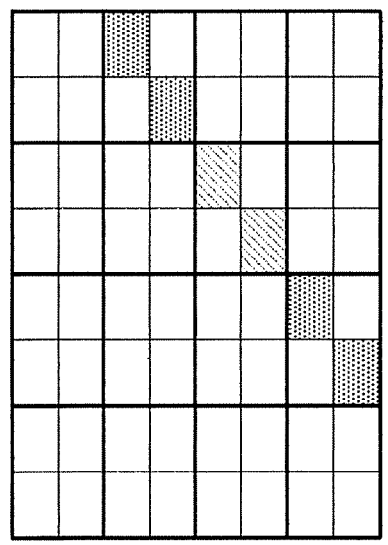
FIG. 23A is a diagram showing a relationship between an original image and a template.

For example, the template 8 (it is same as the template 8 shown in FIG. 19 when BTC(bij)=01 is satisfied) shown in FIG. 23A is the template of X1 group designed so as to predict the density pattern in the thin line structure of slash of one dot width included in the original image.

As shown in FIG. 23A, when the original image of a00-a77 includes a slash image of the one dot width, since four pixels of a44, a45, a54 and a55 satisfy the high resolution condition and correspond to the density pattern H1, pixel b22 of the processed image corresponding to the four pixels should be quantized to BTC(b22)=01. Accordingly, when decoding, it is possible to predict that densities of these dots are same degree because the pixel of b22 is one dot width from the density patterns of b13 and b31 (upper right and lower left of the attention pixel b22) of the peripheral pixels and is arranged so as to connect to dots formed by the pixels b13 and b31. Accordingly, in order to predict these density patterns, as shown in FIG. 23A, the template 8 defining the coincidence condition M1 is prepared in the peripheral pixels.

Figure 23B:
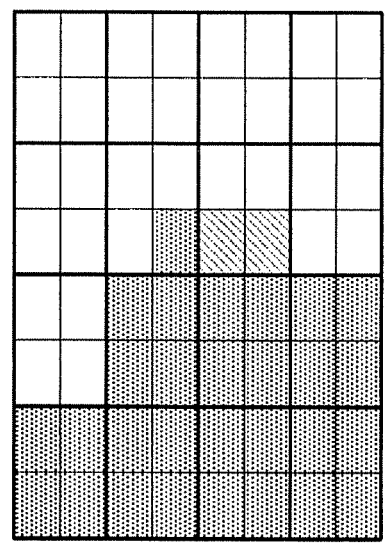
FIG. 23B is a diagram showing a relationship between an original image and a template.

The template 20 (it is same as the template 20 shown in FIG. 18 when BTC(bij)=01 is satisfied) shown in FIG. 23B is the template of X2 group. As shown in FIG. 23B, in the original image, when the pixels of a00 to a77 composes an edge of an image having some density, the high resolution condition is satisfied and the pixels correspond to the density pattern H1. Accordingly, when decoding, in order to predict density patterns in the edge shape, as shown in FIG. 23B, the template 20, and so on defining the coincidence conditions of C are prepared in the peripheral pixels. Since the b12 right above B22 satisfies the high resolution condition, the coincidence conditions of C right above b22 is not satisfied in the template 20. However, three pixels on the left side of b22 satisfy the coincidence conditions of C. The evaluation value will become high and the possibility that it matches to the template 20 will become large.

Moreover, in order to perform a weighting evaluation, it is possible to set a weighting coefficient in the templates of X2 and X3 groups. For example, in a case of the original image shown in FIG. 23B, when all of three pixels in left side of the attention pixel b22 satisfy the coincidence conditions of C, the possibility of the density pattern that two pixels have a value of 1 in left side in 2×2 pixels of the attention pixel b22 is high. Accordingly, with respect to the three pixels that position at the left side of the attention pixel b22 of the template 20, for example, the weighting coefficient of twofold, and so on is set in advance, and when the coincidence conditions of C are satisfied in these three pixel positions, the evaluation value is set to a value obtained by multiplying the weighting coefficient. Thereby, it is possible to adjust it so that the coincidence rate to the template may become high.

The templates shown in FIG. 17 to FIG. 22 are examples. It is possible to suitably design according to the edge shape, and so on that are considered to be included in the original image.

Figure 14:
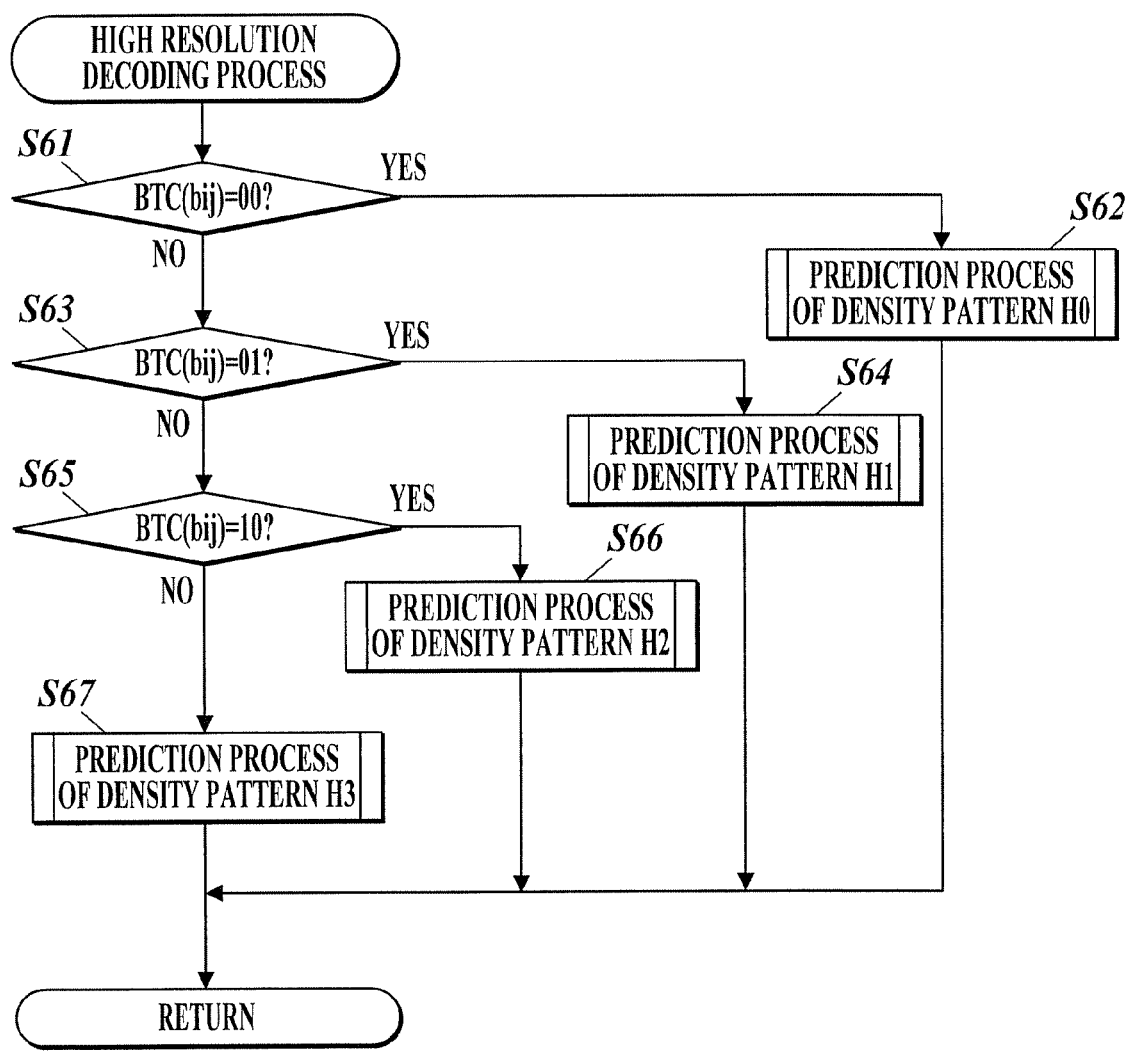
FIG. 14 is a flowchart showing a flow of the high resolution condition process.

As a flow of processes, as shown in FIG. 14, first, BTC(bij) is referred because a template to be used differs according to the data value of BTC(bij). When BTC(bij)=00 is satisfied (step P61, Y), the step moves to a prediction process of the density pattern H0 of BTC(bij)=00 (step P62). In a same manner, when BTC(bij)=01 is satisfied (steps P61, N; S62, Y), the step moves to a prediction process of the density pattern H1 of BTC(bij)=01 (step P 64), and when BTC(bij)

=10 is satisfied (steps P61, N; S63, N; S65, Y), the step moves to a prediction process of the density pattern H2 of BTC(bij) =10 (step P 66). Also, when BTC(bij)=11 is satisfied (steps P61, N; S63, N; S65, N), the step moves to a prediction process of the density pattern H3 of BTC(bij)=11 (step P67).

With respect to the prediction processes of the density patterns H0 to H3, though the templates to be used are only different, the contents of the processes are basically same. Accordingly, as a representative example, the prediction process (see FIG. 15) of the density pattern H0 is explained when BTC(bij)=00 is satisfied.

Figure 15:
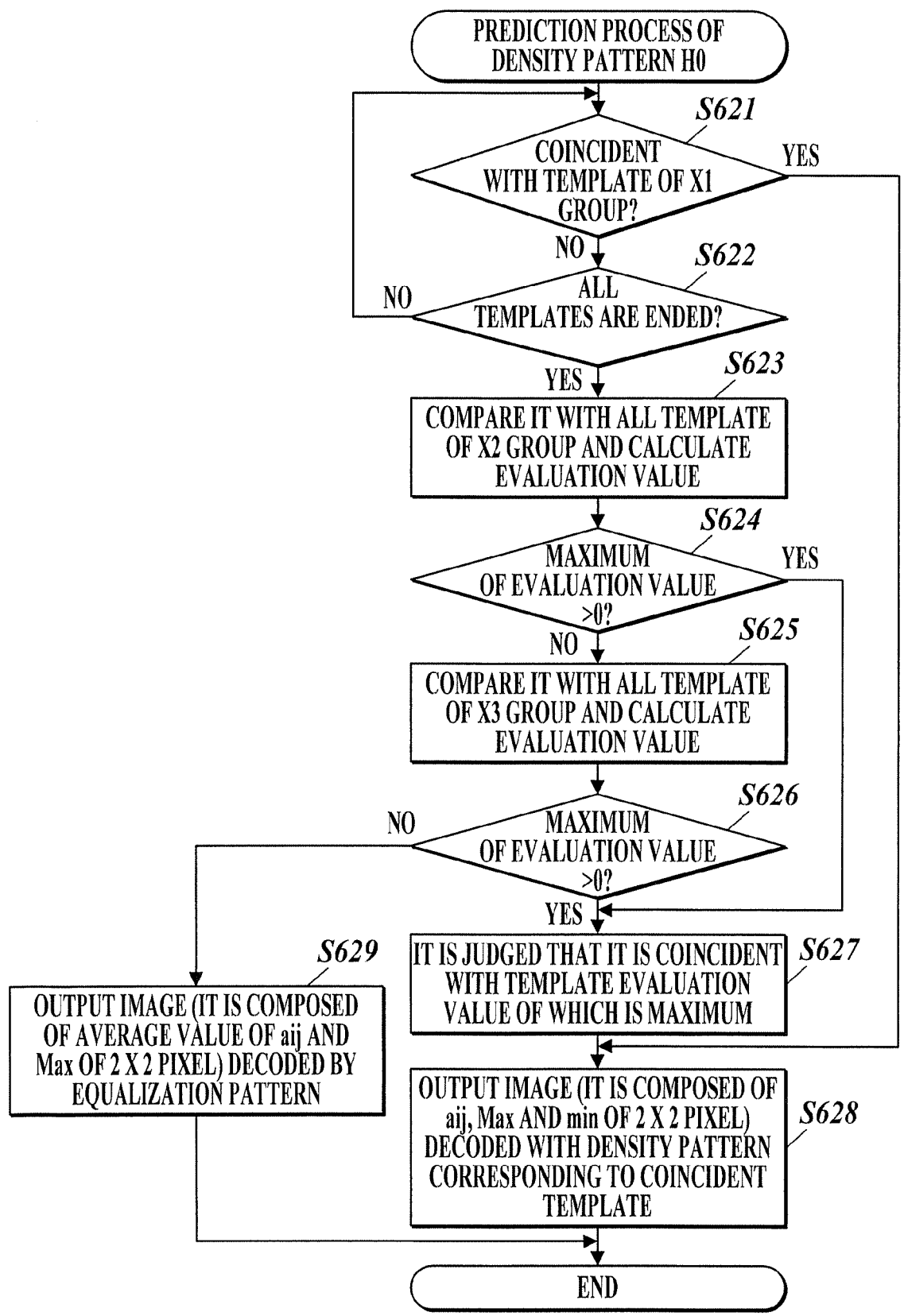
FIG. 15 is a flowchart showing a flow of a prediction process of density pattern H0.

As shown in FIG. 15, first, an attention pixel bij is set as a center, and the matching is performed to one of the templates of X1 group. When it is coincident with the template used for the matching (step P621, Y), it is decoded by a density pattern corresponding to the template matched as density pattern of the pixel bij and the decoded image (aij of 2×2 pixels) is outputted (step P628). The decoding is performed by replacing the data value of 1 in the density pattern with Max and replacing the data value of 0 in the density pattern with min. When it is patterned to the density pattern in the compression process, a value near Max is replaced to 1, and a value near min is replaced to 0. Accordingly, it is considered that it is possible to restore it to a same degree even if the pixel aij having the data value of 1 is replaced to Max and the pixel aij having the data value of 0 is replaced to min.

For example, when BTC(bij)=00 is satisfied and the matched one is the template 1, as shown in FIG. 17, the predicted density pattern is a density pattern in which a pixel of an upper left is 1 and others are 0. In this density pattern, the image of aij of 2×2 pixels in which the value of 1 is replaced to Max (8 bits) and the value of 0 is replaced to min (8 bits) is outputted as a decoded image (1200 dpi, 8 bits).

When it is not coincident with the matched template (step P621, N), it is judged whether the matching to the all templates of X1 group is ended or not. When the matching to all templates is not ended (step P622, N), the process returns to a process of step P621, and the matching to other templates belonging to the same X1 group is repeated until it is coincident with any of the templates of X group.

In a case that it is not coincident with any of the templates when the matching to all of the templates of X1 group is performed (step P 622, Y), the matching to all of the templates belonging to X2 group is performed and the evaluation value is calculated (step P623). Then, when the maximum value of the evaluation values calculated with respect to each template exceeds 0 (step P624, Y), it is judged that the evaluation value is coincident with the template of the maximum value (step P627). Then, the decoding is performed by a density pattern corresponding to the template coincident with the density pattern of the attention pixel bij, and the decoded image is outputted (step P628).

On the other hand, when any of coincidence conditions defined in the templates of X2 group is not satisfied and the maximum value of the evaluation value is 0 (step P624, N), the matching to all of the templates belonging to X3 group is performed and the evaluation values are calculated (step P625). When the maximum value of the evaluation values with respect to each template exceeds 0 (step P 626, Y), it is judged that it is coincident with the template the evaluation value of which becomes maximum (step P627), and an image decoded by the density pattern corresponding to the templates coincident with the density pattern of the attention pixel bij is composed and outputted (step P 628).

When any of the coincidence conditions defined in the template is not satisfied and the maximum value of the evaluation value is 0 with respect to X3 group (step P626, N), it is considered that the pixel portion having the data value of 1 in aij of 2×2 pixels forms an image of an isolated point. In this case, since it is difficult to predict a density pattern in view of peripheral pixels, a restored image is composed and outputted by an equalization pattern (step P629). As shown in FIG. 16, the equalization pattern is a pattern to which an average value is assigned to each pixel aij of 2×2 pixels.

For example, in a case of the density pattern H0, the data value of 1 is one in aij of 2×2 pixels. That is, the density value of Max is outputted by four pixels. Accordingly, the equalization pattern is a pattern that the average value ¼ Max is assigned to all of aij of 2×2 pixels. In a same manner, since a density of 2 Max is outputted by four pixels in the density patterns H1 and H2 and a density of 3 Max is outputted by four pixels in the density pattern H3, values of ½ Max and ¾ Max being respectively the average values respectively are assigned to aij of 2×2 pixels.

As mentioned above, when the image of aij of the decoded 2×2 pixels is outputted, the step moves to a process of step P7 in FIG. 10.

In the step P7, it is judged whether the half tone decoding process or the high resolution decoding process is ended or not with respect to all in the block of bij of 4×4 pixels of the processed image (step P7). When the processing is not ended, the step returns to step S3 and the processes in steps P3 to p7 are repeated with respect to other one pixel bij in the block of bij of 4×4 pixels.

Then, the processes are ended with respect to all in the block of bij of 4×4 pixels (step P7, Y) the decoded image of aij of 8×8 pixels is composed from the decoded image of 2×2 pixel unit of aij outputted with respect to each pixel bij of the block of bij of 4×4 pixels, and outputted (step P8). After that, it is judged whether the process is ended to the end of the processed image (step P9). When the process is not ended (step P9, N), the step returns to step P1, the processes of steps P1 to P9 are repeated with respect to the block of bij of next 4×4 pixels of the processed image. When the processes to the end of the processed image are ended (step P9, Y), this process is completed.

Figure 24:
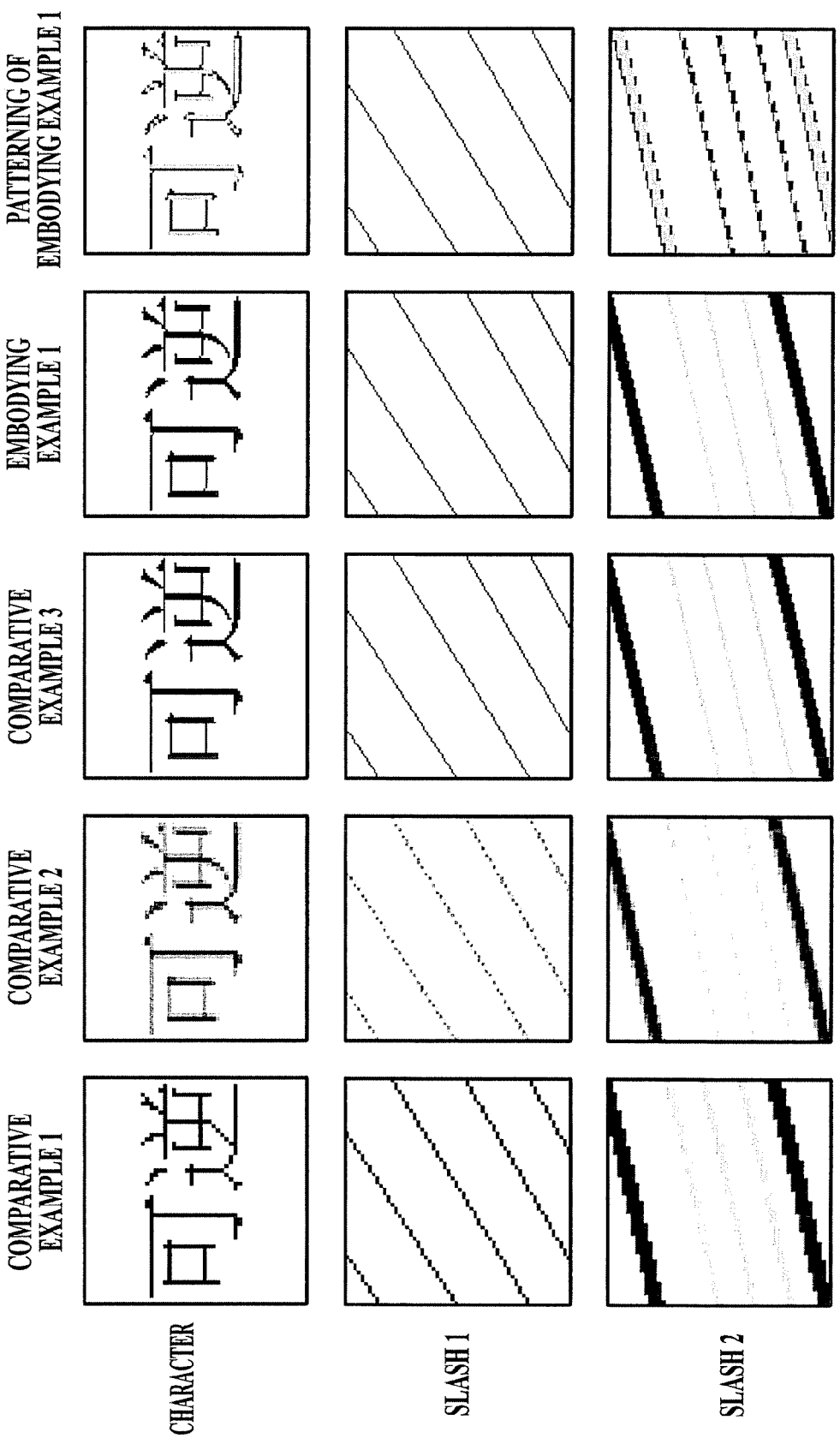
FIG. 24 is a drawing showing processed results by a compression process and an extension process.

FIG. 24 and FIG. 25 are drawings showing embodying examples of this embodiment.

FIG. 24 shows images of Chinese character of "KAGY-AKU (Japanese Pronunciation)" (black 100%), slash 1 (black 100%, thin line of one dot width), slash 2 (the thick line: magenta 100%, six dot widths; thin line: magenta 30%, two dot widths) with respect to comparative examples 1 to 3 and embodying example 1. In addition, the dot width is a dot width of 1200 dpi unit.

On the other hand, FIG. 25 shows character (four colors of CMYK) of "g.", photograph 1 (yellow) relating to a human face, and photograph 2 (four colors of CMYK).

The image processing methods in comparative examples 1 to 3 and an embodying example 1 are shown as follows.

Comparative example 1: with respect to an image rasterized by 600 dpi and 8 bits, an image of 1200 dpi is obtained by copying the data value of one pixel of 600 dpi to four pixels of 1200 dpi.

Comparative example 2: with respect to an image rasterized by 1200 dpi and 8 bits, after a resolution conversion to 600 dpi (a value obtained by averaging the data values of four pixels of 1200 dpi is assigned to one pixel of 600 dpi) is performed by averaging the image, an image is obtained by performing the resolution conversion to the original 1200 dpi (a pixel is simply divided to four pixels and same value is assigned to the four pixels).

Comparative example 3: an image rasterized by 1200 dpi and 8 bits. This comparative example 3 is a target image quality.

Embodying example 1: with respect to an image rasterized by 1200 dpi and 8 bits, after a compression and resolution conversion to 600 dpi and 4 bits is performed by the compression method relating to the above mentioned embodiment, an image is obtained by performing an extension and resolution conversion to 1200 dpi and 8 bits by the extension method relating to the embodiment.

Moreover, in FIG. 24 and FIG. 25, the image shown in right side of the embodying example 1 is an image obtained by patterning a half tone area and a high resolution area by adding different designs in order to easily understand image portions which are judged as the half tone area and the high resolution area.

As shown in FIG. 24 and FIG. 25, in the method of the comparative example 2 in which the resolution conversion is simply performed, since data is lost in the processes of the compression and the resolution conversion, the reproducibility of the edge portion of the character and the line drawing becomes limited and the sharpness of the edge is missing. As a result, the character becomes a rough image like an out-of-focus image wholly.

In contrast, in the embodying example 1, even if it is a thin line of one dot width, although repeatability is a little missing in details, it succeeds in performing mostly correctly reproduction of the thin line in the comparative example 3 in which the rasterized data of 1200 dpi and 8 bits are printed. Also, the reproducibility of the edge portion is high, and the sharpness of the character or the line drawing is mostly same as the comparative example 3 in which the rasterized data of 1200 dpi and 8 bits are printed.

As mentioned above, according to this embodiment, the quantization method is determined for each pixel, the quantization is performed for pixel unit by the determined method, data BTC(bij) after performing the quantization is stored in the BTC plane area in spite of the quantization method. Thereby, it is possible to perform the quantization corresponding to characteristics of an image in pixel unit, and suppress image quality deterioration generated by the compression process. Also, since the data flag(bij) of the discrimination flag indicative of the used quantization method is stored in the discrimination plane area, it is possible to perform the extension corresponding to each of the quantization methods by the discrimination flag at the time of extension.

With respect to pixels of the half tone area which does not need the high resolution especially, it is possible to perform the compression that density value that is gradation is taken into consideration as important matter. On the other hand, with respect to the high resolution area necessary to maintain the high resolution, since shapes etc of the edge are patterned to density patterns and the quantization corresponding to the density pattern is performed, it is possible to perform the compression that maintaining the resolution is taken into consideration as important matter. Especially, since the prediction of the density pattern is performed from the peripheral pixel at the time of extension, it is possible to improve the reproducibility of the image.

Also, in a case of the quantization, since the resolution conversion to the low resolution is performed, it is possible to save memory areas for storing the quantized image and avoid the high cost. Since the resolution conversion for retuning to the resolution before the quantization is performed at the time of extension, it is possible to maintain the original high resolution.

It is judged whether aij of 2×2 pixels is the pixel of the half tone area or the pixel of the high resolution area. When the pixel is a pixel of the half tone area, the quantization is performed based on the density value having aij of 2×2 pixels by the BTC compression method, and when the pixel is a pixel of the high resolution area, the quantization is performed by the density pattern formed by aij of 2×2 pixels. Thereby, it is possible to perform the compression that the gradation is taken into consideration as an important manner with respect to the pixel of the half tone area, and the compression that the high resolution is taken into consideration as an important manner with respect to the pixel of the high resolution area.

In addition, the embodiment is a suitable example of the present invention, and it is not limited to this.

For example, in the embodiment, with respect to any pixel of the half tone area and the high resolution area, though the resolution conversion to the original 1200 dpi is performed at the time of decoding after performing the resolution conversion to 600 dpi that is resolution lower than 1200 dpi, it is possible to perform the decoding to 600 dpi of the low resolution in a case of the pixel of the half tone area.

Also, though an example in a case that 1200 dpi is converted to 600 dpi is explained, for example, it is also possible to compress an image of 2400 dpi and 8 bits to an image of 1200 dpi and 4 bits and restore it to the image of 2400 dpi and 8 bits. That is, it is possible to adapt other resolutions.

Also, in the explanations mentioned above, though the data values of Max and min are store as difference data, it is not limited to this in a case of data used at the time of decoding. For example, the data values of Tha2 and min being the intermediate values are stored, and it is possible to calculate other data values Max, THa1 and THa3 necessary for decoding from THa2 and min.

Also, it is possible to adapt to computer apparatuses for performing the image processes other than the MFP. It is possible to perform the image processes by a software using the program obtained by coding the above mentioned compression method and the decoding method as programs.

(1) According to one aspect of a preferred embodiment of the present invention, there is provided a compression method of quantizing and compressing image data of an image, the method comprising the steps of:

determining a method of quantization for each pixel;

quantizing the image data in pixel unit according to the determined quantization method;

storing the quantized image data in a same region of a memory in spite of the quantization method; and storing discrimination data for discriminating the quantization method used for quantizing the image data by corresponding to the quantized image data in the memory.

According to this, with respect to pixels of an image area in which it is necessary to maintain the high resolution, it is possible to perform a quantization corresponding to characteristics of an image in pixel unit e.g. by determining a quantizing method capable of maintaining the high resolution, and suppress image quality deterioration generated by the compression. Also, it is possible to use an extension method corresponding to the used quantization method by discrimination data at the time of extension. Also, since the image data is stored in the same memory area even if any of methods is used, it is possible to save the memory area necessary for data storage.

(2) Preferably, a resolution conversion is performed to make a resolution of the image low when the quantization is performed to the image data.

According to this, it is possible to save memory areas for storing the quantized image by performing the resolution conversion to the low resolution. Accordingly, it is possible to avoid the high cost without extending a memory.

(3) Preferably, the quantization method differs according to whether the pixel to be quantized is a pixel of a half tone area or a pixel of a high resolution area when the quantization method is determined.

(4) Preferably, the quantization method to be determined when the pixel is the pixel of the half tone area is a method of performing the quantization based on a density value that the pixel of the half tone area has.

(5) Preferably, the quantization method to be determined when the pixel is the pixel of the half tone area is a method of calculating an average value of the density values that a plurality of pixels of the half tone area have, and quantizing the average value.

(6) Preferably, the quantization to be performed when the pixel is the pixel of the half tone area is a quantization by a BTC compression method.

(7) Preferably, difference data to be used for decoding the image data based on a maximum density value and a minimum density value in each block are obtained when the image data are quantized in block unit of n×n pixels by a BTC compression method, and the difference data are stored in the memory by corresponding to the quantized image data.

According to this, it is possible to perform compression that a density value that is, the gradation is taken into consideration as an important manner with respect to the pixel of the half tone area which does not need the high resolution.

(8) Preferably, the quantization method to be determined when the pixel is the pixel of the high resolution area is a method of performing the quantization based on the density pattern of the image.

(9) Preferably, the quantization method to be determined when the pixel is the pixel of the high resolution area is a method of performing the quantization based on the density pattern formed by a plurality of pixels of the high resolution area.

(10) Preferably, the quantization is performed by assigning one quantum to one or more density patterns.

According to this, it is possible to perform compression that a gradation pattern of an image that is, maintaining the resolution is taken into consideration as an important manner with respect to the pixel of the half tone area which needs the high resolution.

(11) Preferably, the quantization method differs according to whether the pixel to be quantized is a pixel of a half tone area or not.

(12) Preferably, the quantization method to be determined when the pixel is a pixel of a half tone area is a method of compressing a quantization level in a BTC compression method.

According to this, it is possible to perform compression that the gradation is taken into consideration as an important manner by using a quantization method corresponding to pixels of the half tone area which does not especially need the high resolution that is, a compression method using BTC compression method using a density value.

(13) Preferably, the quantization method differs according to whether the pixel to be quantized is a pixel of a high resolution area or not.

(14) Preferably, the quantization method to be determined when the pixel is a pixel of a high resolution area is a method of patterning a shape of an edge included in at least an image to a density pattern and performing the quantization according to the density pattern.

According to this, it is possible to perform compression that maintaining the resolution is taken into consideration as important matter by using a quantization method corresponding to pixels of the high resolution area necessary to maintain the high resolution that is, a method using density patterns obtained by patterning shapes etc. of the edge.

(15) Preferably, in a compression method of quantizing image data of an image for each pixel by a BTC compression method, storing difference data to be used for decoding the quantized image data in a difference plane area of a memory and storing the quantized image data in a BTC plane area of the memory, the method comprises the steps of:

quantizing the image data by a compression method different from the BTC compression method with respect to a pixel of an image portion including at least an edge; and storing the quantized image data in the BTC plane area; and storing discrimination data for discriminating the quantization method to be used for the quantized image data for each pixel in the memory.

According to this, with respect to pixels of an edge, and so on necessary to maintain the high resolution, it is possible to perform a quantization corresponding to characteristics of an image in pixel unit e.g. by determining a quantizing method capable of maintaining the high resolution without using the BTC method, and suppress image quality deterioration generated at an edge by the compression or resolution conversion. Also, it is possible to use an extension method corresponding to the used quantization methods by discrimination data at the time of extension. Also, since the image data is stored in the same memory area even if any of methods is used, it is possible to save the memory area necessary for data storage.

(16) According to an aspect of a preferred embodiment of the present invention, there is provided an extension method of decoding and extending the image data quantized by using the compression method according to the present invention of the item (1), the method comprising the step of:

decoding the quantized image data according to the discrimination data corresponding to the quantized image data.

According to this, it is possible to discriminate a quantization method in pixel unit using discrimination data, and perform extension corresponding to the quantization method.

(17) According to an aspect of a preferred embodiment of the present invention, there is provided the extension method of decoding and extending the image data quantized by using the compression method according to the present invention of the item (2), the method comprising the step of:

performing a resolution conversion to a same resolution of the image of the image data that is not quantized when decoding the quantized image data.

(18) According to an aspect of a preferred embodiment of the present invention, there is provided the extension method of decoding and extending the image data quantized by using the compression method according to the present invention of item (4), the method comprising the step of:

performing a resolution conversion to a same resolution of the image of the image data that is not quantized with respect to pixel of the half tone area when decoding the quantized image data; and setting all of a plurality of pixels obtained by the resolution conversion to a same density value.

According to this, it is possible to maintain the original high resolution.

(19) According to an aspect of a preferred embodiment of the present invention, there is provided the extension method of decoding and extending the image data quantized by the compression method according to the present invention of item (4), the method comprising the step of:

decoding the image data in a low resolution of the image of the image data obtained by performing the resolution conversion when decoding the quantized image data with respect to pixels of the half tone area.

According to this, it is possible to omit a resolution conversion with respect to pixels of the half tone area which does not especially need the high resolution. Then, the process efficiency becomes good.

(20) According to an aspect of a preferred embodiment of the present invention, there is provided the extension method of decoding and extending the image data quantized by using the compression method according to the present invention of item (8), the method comprising the step of:

predicting a density pattern of the same resolution before the quantizing when decoding the quantized image data with respect to the pixel of the high resolution area; and decoding the quantized image data according to the predicted density pattern.

According to this, it is possible to improve reproducibility of an image while maintaining high resolution of an original image.

(21) According to other aspect of a preferred embodiment of the present invention, there is provided an image processing apparatus for quantizing and compressing image data of an image, the apparatus comprising:

a memory; and an image erosion converting section for determining a method of quantization for each pixel, quantizing the image data in pixel unit according to the determined quantization method, storing the quantized image data in a same region of a memory in spite of the quantization method, and storing discrimination data for discriminating the quantization method used for quantizing the image data by corresponding to the quantized image data in the memory.

According to this, with respect to pixels of an image area in which it is necessary to maintain the high resolution, it is possible to perform a quantization corresponding to characteristics of an image in pixel unit e.g. by determining a quantizing method capable of maintaining the high resolution, and suppress image quality deterioration generated by the compression.

(22) According to an aspect of a preferred embodiment of the present invention, there is provided an image processing apparatus comprising:

a memory; and an image erosion converting section for quantizing image data of an image for each pixel by a BTC compression method, storing difference data to be used for decoding the quantized image data in a difference plane area of a memory and storing the quantized image data in a BTC plane area of the memory, wherein the image erosion converting section stores the quantized image data in the BTC plane area, and stores discrimination data for discriminating the quantization method used for the quantized image data for each pixel in the memory.

According to this, with respect to pixels of an edge, and so on necessary to maintain the high resolution, it is possible to perform a quantization corresponding to characteristics of an image in pixel unit e.g. by determining a quantizing method capable of maintaining the high resolution without using the BTC method, and suppress image quality deterioration generated at an edge by the compression or resolution conversion. Also, it is possible to use an extension method corresponding to the used quantization methods by discrimination data at the time of extension.

(23) According to an aspect of a preferred embodiment of the present invention, there is provided an image processing apparatus for decoding and extending the image data quantized by the image processing apparatus according to the present invention of item (21), the apparatus comprising:

an image prediction converting section for decoding the quantized image data according to the discrimination data corresponding to the quantized image data.

According to this, it is possible to discriminate a quantization method in pixel unit using discrimination data, and perform extension corresponding to the quantization method.

The entire disclosure of Japanese Patent Applications No. 2007-260877 filed on Oct. 4, 2007 including specifications, claims, drawings and summaries are incorporated herein by reference in their entirety.

What is claimed is:

1. A compression method of quantizing and compressing image pixels, said method comprising the steps of:

determining a method for quantizing n×n pixels for each block unit of n×n pixels;

quantizing the n×n pixels according to the determined quantization method;

storing data of the quantized n×n pixels in a Block Truncation Coding plane region in a memory independent of the quantization method used for the n×n pixels; and storing discrimination data, corresponding to the quantization method used for quantizing the data of the n×n pixels, in the memory, wherein the quantization method used for the n×n pixels differs according to whether individual pixels of the n×n pixels to be quantized are pixels of a half tone area or pixels of a high resolution area when the quantization method is determined, such that (i) pixels of the half tone area are quantized by a Block Truncation Coding compression method, and (ii) pixels of the high resolution area are quantized based on a density pattern formed by the n×n pixels.

2. The compression method according to claim 1, wherein a resolution conversion is performed to make a resolution of the n×n pixels low when the quantization is performed on the n×n pixels.

3. The compression method according to claim 1, wherein when the n×n pixels include pixels of the half tone area, an average value of density values of the n×n pixels is calculated, and the average value is quantized.

4. The compression method according to claim 1, wherein difference data to be used for decoding the n×n pixels based on a maximum density value and a minimum density value in each block is obtained when the n×n pixels are quantized in block units of n×n pixels by the Block Truncation Coding compression method, and the each difference data is stored in the memory by corresponding each difference data to the data of the quantized n×n pixels.

5. The compression method according to claim 1, wherein the quantization is performed by assigning one quantum to one or more density patterns.

6. The compression method according to claim 1, wherein the density pattern is a pattern of an edge shape included in the n×n pixels.

7. An extension method of decoding and extending the pixels quantized by the compression method according to claim 1, said method comprising the step of:

decoding the quantized n×n pixels according to the discrimination data corresponding to the data of the quantized n×n pixels.

8. An extension method of decoding and extending the pixels quantized by the compression method according to claim 1, said method comprising the step of:

performing a resolution conversion so as to have a same resolution as the n×n pixels before quantization when decoding the quantized pixels.

9. An extension method of decoding and extending the pixels quantized by the compression method according to claim 1, said method comprising the step of:

performing a resolution conversion on the pixels of the half tone area so as to have a same resolution of the pixels that is not quantized when decoding the quantized pixels; and setting all of a plurality of converted pixels to a same density value.

10. An extension method of decoding and extending the pixels quantized by the compression method according to claim 1, said method comprising the step of:

decoding the pixels in a low resolution obtained by performing a resolution conversion at the time of quantization, when decoding the quantized image data with respect to pixels of the half tone area.

11. An extension method of decoding and extending the pixels quantized by the compression method according to claim 1, said method comprising the step of:

predicting a density pattern of a resolution same as a resolution before the quantizing when decoding the pixels of the high resolution area; and decoding the quantized pixels according to the predicted density pattern.

12. An image processing apparatus for quantizing and compressing pixels, said apparatus comprising:

a memory; and an image erosion converting section for (i) determining a method for quantizing pixels for each block unit of n×n pixels, (ii) performing quantization in n×n pixels units according to the determined quantization method for respective pixel units, (iii) storing data of the quantized n×n pixels in a Block Truncation Coding plane region in a memory independent of the quantization method, and (iv) storing discrimination data for discriminating the quantization method used for quantizing by corresponding said discrimination data to the data of the quantized n×n pixels in the memory, wherein the quantization method used for the n×n pixels differs according to whether individual pixels of the n×n pixels to be quantized are pixels of a half tone area or pixels of a high resolution area when the quantization method is determined, such that (i) pixels of the half tone area are quantized by a Block Truncation Coding compression method, and (ii) pixels of the high resolution area are quantized based on a density pattern formed by the n×n pixels.

13. An image processing apparatus for decoding and extending the pixels quantized by the image processing apparatus according to claim 12, said apparatus comprising:

an image prediction converting section for decoding the quantized n×n pixels according to the discrimination data corresponding to the data of the quantized n×n pixels.

* * * * *